United States Patent
Ju et al.

(10) Patent No.: US 11,437,660 B2
(45) Date of Patent: Sep. 6, 2022

(54) BATTERY MODULE

(71) Applicant: LG CHEM, LTD., Seoul (KR)

(72) Inventors: Eun-Ah Ju, Daejeon (KR); Sung-Won Seo, Daejeon (KR); Yoon-Koo Lee, Daejeon (KR); Hee-Jun Jin, Daejeon (KR); Jeong-O Mun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 141 days.

(21) Appl. No.: 16/341,236

(22) PCT Filed: May 28, 2018

(86) PCT No.: PCT/KR2018/006013
§ 371 (c)(1),
(2) Date: Apr. 11, 2019

(87) PCT Pub. No.: WO2018/230857
PCT Pub. Date: Dec. 20, 2018

(65) Prior Publication Data
US 2019/0260099 A1 Aug. 22, 2019

(30) Foreign Application Priority Data
Jun. 13, 2017 (KR) .......................... 10-2017-0074237

(51) Int. Cl.
*H01M 10/48* (2006.01)
*H01M 10/613* (2014.01)
(Continued)

(52) U.S. Cl.
CPC ......... *H01M 10/486* (2013.01); *H01M 10/48* (2013.01); *H01M 10/613* (2015.04);
(Continued)

(58) Field of Classification Search
CPC .. H01M 10/425; H01M 10/48; H01M 10/482; H01M 10/486; H01M 10/613;
(Continued)

(56) References Cited

U.S. PATENT DOCUMENTS

2013/0101881 A1* 4/2013 Syed ...................... B60L 50/64
429/120
2013/0280565 A1 10/2013 Lee et al.
(Continued)

FOREIGN PATENT DOCUMENTS

| CN | 104979522 A | 10/2015 |
|---|---|---|
| CN | 105556318 A | 5/2016 |

(Continued)

OTHER PUBLICATIONS

Machine translation of Korean Patent Publication No. 10-2013-0025245, published Mar. 11, 2013. (Year: 2013).*
(Continued)

*Primary Examiner* — Stewart A Fraser
*Assistant Examiner* — Lilia Nedialkova
(74) *Attorney, Agent, or Firm* — Birch, Stewart, Kolasch & Birch, LLP

(57) ABSTRACT

A battery module including a cell assembly having a plurality of secondary batteries stacked in at least one direction and configured so that electrode leads of the secondary batteries protrude in at least one direction of forward direction and a rearward direction thereof; an upper housing disposed at an upper portion of the cell assembly; and a sensing block located at at least one of a front side and a rear side of the cell assembly and having a bus bar made of an electrically conductive material and contacting the electrode leads of the secondary batteries at the corresponding front side or rear side of the cell assembly is provided. The sensing block being slidably coupled to the upper housing.

12 Claims, 19 Drawing Sheets

(51) Int. Cl.
  *H01M 10/625*   (2014.01)
  *H01M 10/6554*  (2014.01)
  *H01M 50/20*    (2021.01)
  *H01M 50/50*    (2021.01)
  *H01M 10/6555*  (2014.01)

(52) U.S. Cl.
  CPC ..... *H01M 10/625* (2015.04); *H01M 10/6554* (2015.04); *H01M 10/6555* (2015.04); *H01M 50/20* (2021.01); *H01M 50/50* (2021.01)

(58) Field of Classification Search
  CPC ............. H01M 10/625; H01M 10/647; H01M 10/6557; H01M 10/6555; H01M 10/6556; H01M 10/6554–07; H01M 50/20; H01M 50/211; H01M 50/224; H01M 50/227; H01M 50/50; H01M 50/505; H01M 50/569; H01M 2220/20; Y02E 60/10
  See application file for complete search history.

(56) References Cited

U.S. PATENT DOCUMENTS

| | | | |
|---|---|---|---|
| 2013/0323549 A1* | 12/2013 | Choi | H01M 50/581 429/62 |
| 2014/0065467 A1* | 3/2014 | Choi | H01R 11/288 429/158 |
| 2014/0087221 A1* | 3/2014 | Kim | H01M 50/20 429/158 |
| 2016/0233465 A1 | 8/2016 | Lee et al. | |
| 2016/0248070 A1* | 8/2016 | Ahn | H01M 2/1061 |
| 2017/0077562 A1* | 3/2017 | Park | H01M 10/425 |
| 2017/0187017 A1 | 6/2017 | Zhang et al. | |
| 2018/0138565 A1 | 5/2018 | Lee et al. | |

FOREIGN PATENT DOCUMENTS

| | | | | |
|---|---|---|---|---|
| EP | 3 065 197 A1 | 9/2016 | | |
| JP | 3899423 B2 | 3/2007 | | |
| JP | 2011-171114 A | 9/2011 | | |
| JP | 2014-500587 A | 1/2014 | | |
| JP | 2014-507058 A | 3/2014 | | |
| JP | 6117308 B2 | 4/2017 | | |
| KR | 10-2013-0025245 A | 3/2013 | | |
| KR | 10-2014-0081960 A | 7/2014 | | |
| KR | 10-2015-0050314 A | 5/2015 | | |
| KR | 10-2015-0078083 A | 7/2015 | | |
| KR | 10-2015-0115610 A | 10/2015 | | |
| KR | 10-2016-0016502 A | 2/2016 | | |
| KR | 10-2017-0036639 A | 4/2017 | | |
| KR | 10-2017-0041257 A | 4/2017 | | |
| KR | 10-2017-0050508 A | 5/2017 | | |
| KR | 10-2017-0054878 A | 5/2017 | | |
| KR | 10-2017-0063429 A | 5/2017 | | |
| WO | WO 2015/080466 A1 | 6/2015 | | |
| WO | WO-2015133760 A1 * | 9/2015 | ........ | H01M 10/482 |
| WO | WO 2015/152527 A | 10/2015 | | |
| WO | WO 2017/039180 A1 | 3/2017 | | |

OTHER PUBLICATIONS

International Search Report for PCT/KR2018/006013 (PCT/ISA/210) dated Sep. 6, 2018.
English language translation of KR 10-2015-0115610 A, published Oct. 14, 2015.
Extended European Search Report dated Jun. 3, 2020 for Application No. 18817606.9.
Partial Supplementary European Search Report for Application No. 18817606.9, dated Feb. 13, 2020.
Liu et al., "Research and Development of Lithium-ion Batteries for Hybrid Electric Vehicles," Power Technology, vol. 31, No. 7, Jul. 20, 2007, pp. 509-514, with English abstract.

* cited by examiner

BATTERY MODULE

TECHNICAL FIELD

The present application claims priority to Korean Patent Application No. 10-2017-0074237 filed on Jun. 13, 2017 in the Republic of Korea, the disclosures of which are incorporated herein by reference.

The present disclosure relates to a battery module, and more particularly, to a battery module ensuring easy assembling of sensing components, and a battery pack and a vehicle including the battery module.

BACKGROUND ART

Recently, the demand for portable electronic products such as notebooks, smart phones and smart watches has rapidly increased, and batteries, robots and satellites for energy storage have been actively developed. For this reason, a high-performance secondary battery allowing repeated charging and discharging is being actively studied.

Secondary batteries commercially available at present include nickel-cadmium batteries, nickel-hydrogen batteries, nickel-zinc batteries and lithium secondary batteries, among which lithium secondary batteries are greatly highlighted since they allow free charging and discharging due to almost no memory effect compared to nickel-based secondary batteries and also have a very low self-discharge rate and high energy density.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate respectively coated with a positive electrode active material and a negative electrode active material are disposed with a separator interposed therebetween, and an exterior, namely a battery case, for hermetically accommodating the electrode assembly along with an electrolyte.

Generally, the lithium secondary battery may be classified as a can-type secondary battery in which the electrode assembly is included in a metal can, and a pouch-type secondary battery in which the electrode assembly is included in a pouch made of an aluminum laminate sheet, depending on the shape of the exterior.

Recently, the secondary batteries have been widely used not only in small-sized devices such as portable electronic devices but also in middle-sized and large-sized devices such as vehicles and power storage devices. In particular, as carbon energy is getting depleted and the interest in the environment is increasing, attention is focused on hybrid vehicles and electric vehicles all over the world including USA, Europe, Japan and Korea. The most important component in such a hybrid vehicle or electric vehicle is a battery pack that gives a driving power to a vehicle motor. Since the hybrid vehicle or electric vehicle is able to obtain the driving power of the vehicle by charging and discharging the battery pack, the fuel efficiency is higher than that of a vehicle using only the engine, and pollutants are not discharged or greatly reduced, resulting in gradually increasing users.

Most battery packs, especially middle-sized and large-sized battery packs for hybrid and electric vehicles and energy storage system (ESS) include at least one battery module, and the battery module includes a plurality of secondary batteries. In addition, these plurality of secondary batteries are connected in series and/or in parallel with one another in the battery module, thereby improving the capacity and the output. Further, pouch-type secondary batteries are frequently used in the middle-sized and large-sized battery packs because they are easy to stack and are light in weight and may be provided in a large number.

In the battery module using the pouch-type secondary batteries, the voltage of each secondary battery may be sensed for the purpose of measuring the performance of the secondary battery, detecting a failure, and performing cell balancing. A representative way to sense the voltage of the secondary battery is to use a bus bar. For example, a sensing bar in the form of a metal plate is brought in contact with a point where electrode leads of each secondary battery are in contact with each other, and the sensed voltage or the like may be transmitted to a control device such as a battery management system (BMS) through a sensing cable or the like connected to the sensing bus bar.

One of the important things in configuring the battery module including the sensing bus bar is ensuring good assembling. If good assembling is not ensured when the battery module is assembled, the time for manufacturing the battery module is increased and the overall manufacturing cost is increased. Also, if the battery module is not easily assembled, it is difficult to automate the manufacture of the battery module and the defect rate of the battery module may increase.

DISCLOSURE

Technical Problem

The present disclosure is designed to solve the problems of the related art, and therefore the present disclosure is directed to providing a battery module, which may ensure easy assembling of components for sensing secondary batteries, and a battery pack and a vehicle including the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising: a cell assembly having a plurality of secondary batteries stacked in at least one direction and configured so that electrode leads of the secondary batteries protrude in at least one direction of a forward direction and a rearward direction thereof; an upper housing disposed at an upper portion of the cell assembly; and a sensing block located at at least one of a front side and a rear side of the cell assembly and having a bus bar made of an electrically conductive material and contacting the electrode leads of the secondary batteries at the corresponding front side or rear side of the cell assembly, the sensing block being slidably coupled to the upper housing.

Here, the cell assembly may be configured so that the electrode leads protrude at both the front side and the rear side of the cell assembly, and the sensing block may include a front block located at the front side of the cell assembly and a rear block located at the rear side of the cell assembly.

In addition, the sensing block may be configured to be slidable in the forward direction and the rearward direction relative to the cell assembly.

In addition, the sensing block may further include a bus bar mounting portion located so that the bus bar is mounted thereto, and at least one sliding portion located at an upper portion of the bus bar mounting portion to protrude toward the upper housing, the sliding portion being slidably coupled to the upper housing.

In addition, the upper housing may have a guide portion into which the sliding portion is inserted so as to be movable along the forward direction and the rearward direction relative to the cell assembly.

In addition, the guide portion may have a hollow shape formed at the upper housing and extending along the forward direction and the rearward direction relative to the cell assembly.

In addition, the battery module may further comprise a sensing cable extending in the forward direction and the rearward direction relative to the cell assembly and electrically connected to the bus bar to provide a path for transmitting sensed information from the bus bar.

In addition, the sensing cable may have an adjustable length.

In addition, the sensing block may have a hole through which one of the electrode leads of the electrode leads of the secondary batteries at the corresponding front sider or rear side of the cell assembly extends, the bus bar being mounted to an outer side of the sensing block.

In addition, the battery module may further comprise a cooling plate made of a plate-shaped thermally conductive material and disposed at a lower portion of the cell assembly to absorb heat of the cell assembly, the sensing block may further include an auxiliary coupling portion provided at a lower portion thereof to protrude toward the cooling plate, and the cooling plate may further include an auxiliary insert portion so that the auxiliary coupling portion is inserted therein and movable in the forward direction and the rearward direction relative to the cell assembly.

In addition, the sensing block may further include a stopper for limiting a sliding distance of the sensing block within a predetermined distance.

In another aspect of the present disclosure, there is also provided a battery pack, which includes the battery module described above.

In another aspect of the present disclosure, there is also provided a vehicle, which includes the battery module described above.

Advantageous Effects

According to an embodiment of the present disclosure, it is possible to provide a battery module with improved assembling.

In particular, since the battery module according to the present disclosure includes a sensing bus bar, the sensing component for sensing a voltage or the like of the secondary battery may be assembled more easily.

Further, according to an embodiment of the present disclosure, in manufacturing the battery module, the process of assembling the sensing component may be automated more easily.

In addition, according to an embodiment of the present disclosure, since bolts or the like may not be used for coupling the sensing component, the number of components is reduced, thereby simplify the assembly process and saving the manufacturing cost and time. Moreover, since a bolt or the like does not protrude outside the battery module, the space required for mounting the battery module may be further reduced, and the mounting performance may be improved.

Also, according to an embodiment of the present disclosure, the sensing component may be easily separated from the cell assembly. Thus, when the sensing component and the cell assembly are separated from each other for replacing or repairing a part of the battery module, the separation process may be easily performed.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
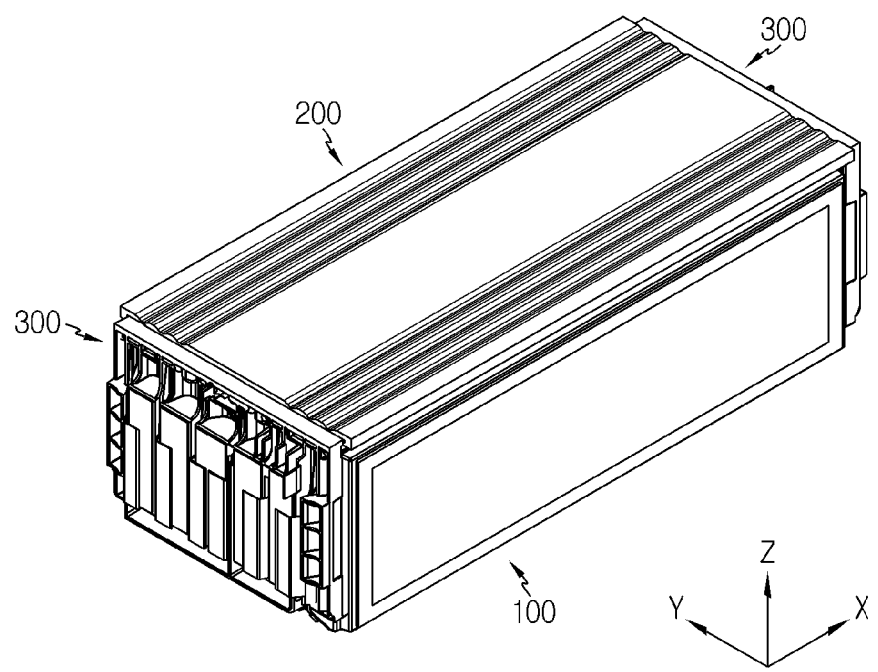
FIG. 1 is a perspective view schematically showing a battery module according to an embodiment of the present disclosure in an assembled state.
Figure 2:
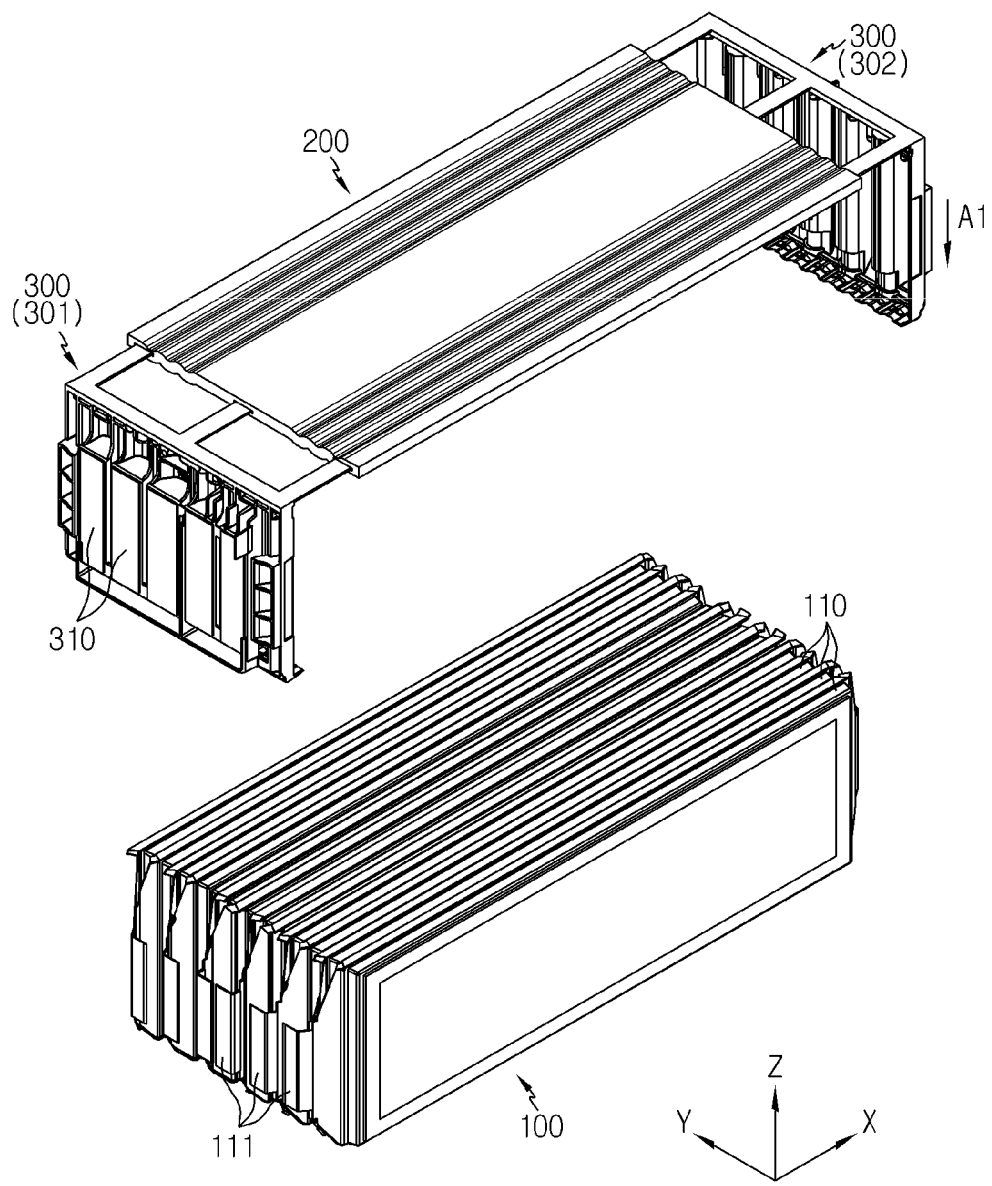
FIG. 2 is an exploded perspective view of FIG. 1.

FIG. 1 is a perspective view schematically showing a battery module according to an embodiment of the present disclosure in an assembled state, and FIG. 2 is an exploded perspective view of FIG. 1.

Referring to FIGS. 1 and 2, a battery module according to the present disclosure may include a cell assembly 100, an upper housing 200, and a sensing block 300.

The cell assembly 100 may include a plurality of secondary batteries 110. In particular, the cell assembly 100 may include a plurality of pouch-type secondary batteries as the secondary batteries 110. The pouch-type secondary battery 110 may include an electrode assembly, an electrolyte, and a pouch exterior.

Here, the electrode assembly may be configured such that at least one positive electrode plate and at least one negative electrode plate are disposed with a separator interposed therebetween. More specifically, the electrode assembly may be classified into a winding type in which one positive electrode plate and one negative electrode plate are wound together with a separator, and a stacking type in which a plurality of positive electrode plates and a plurality of negative electrode plates are alternately stacked with a separator interposed therebetween.

In addition, the pouch exterior may be configured to include an outer insulation layer, a metal layer, and an inner adhesive layer. More specifically, the pouch exterior may be configured to include a metal layer, for example an aluminum foil, in order to protect components therein such as the electrode assembly and the electrolyte, supplement the electrochemical properties of the electrode assembly and the electrolyte, and improve heat radiating property. In addition, in order to ensure electrical insulation to the components in the secondary battery 110 such as the electrode assembly and the electrolyte and other components out of the secondary battery 110, the aluminum foil may be interposed between insulation layers made of insulation materials (the outer insulation layer and the inner adhesive layer).

In particular, the pouch exterior may include two pouches, at least one of which may have an inner space in a concave form. In addition, the electrode assembly may be accommodated in the inner space of the pouch. At this time, sealing portions may be provided at the outer circumferential surfaces of two pouches, and the sealing portions may be fused to each other to seal the inner space accommodating the electrode assembly.

The battery module according to an embodiment of the present disclosure may adopt various types of pouch-type secondary batteries known at the time of filing of this application. Thus, the internal configuration of the secondary battery 110 provided at the cell assembly 100 will be not described in detail.

The plurality of pouch-type secondary batteries 110 may be stacked in at least one direction, for example in a left and right direction (in the y-axis direction in the figure) as shown in the figures. At this time, each pouch-type secondary battery 110 may be configured to stand in an upward and downward direction (in the z-axis direction in the figure) with respect to the ground (the x-y plane in the figure), namely such that its broad surfaces are oriented toward right and left sides and the sealing portions are located at upper and lower sides or at front and rear sides. In addition, in this case, the secondary batteries 110 may be arranged such that their broad surfaces face each other.

Meanwhile, in this specification, unless otherwise stated, the side where the electrode lead 111 is observed in FIG. 1 is referred to as a front side of the battery module, and the upward, downward, right, left, forward and rearward directions are defined from the viewpoint observing the front side.

Each secondary battery 110 provided at the cell assembly 100 may include electrode leads 111. The electrode leads 111 include a positive electrode lead and a negative electrode lead and may function as electrode terminals of the secondary battery 110. Further, in the pouch-type secondary battery 110, the electrode lead 111 may have a plate shape and protrude outside the pouch exterior. In the battery module according to the present disclosure, the electrode leads of each secondary battery 110 may be provided to protrude toward a forward direction (in the −x-axis direction in the figure) or a rearward direction (in the +x-axis direction in the figure) of the cell assembly 100, on at least one of a front end and a rear end of the cell assembly 100.

The upper housing 200 may be disposed at an upper portion of the cell assembly 100. Thus, the upper housing 200 may protect the upper side of the cell assembly 100 from external factors damaging the battery module, such as physical impacts or chemical substances. The upper housing 200 may be made of a material that easily secures rigidity, for example steel, in order to enhance the protection performance. Alternatively, the upper housing 200 may be made of a material that easily secures electrical insulation, for example a polymer material such as plastic.

As shown in the figures, the upper housing 200 may be configured in a substantially flat shape. That is, the upper housing 200 may be positioned at the upper portion of the cell assembly 100 in a lying-down state in which broad sides thereof are oriented upwards and downwards. At this time, since the secondary batteries 110 are arranged in the cell assembly 100 in a right and left direction in a state of standing vertically, the secondary batteries 110 may also be regarded as standing orthogonal to the upper housing 200.

The sensing block 300 may be located to at least one of a front side and a rear side of the cell assembly 100. Since the electrode leads of the secondary battery 10 in the cell assembly 100 may be configured to protrude in a forward direction and/or in a rearward direction at the front end and/or the rear end the cell assembly 100, the sensing block 300 may be disposed at the front side and/or the rear side of the cell assembly 100 so as to be coupled to the electrode leads.

The sensing block 300 may include a bus bar 310. The bus bar 310 may be in direct contact with the electrode lead of the secondary battery 110 provided at the cell assembly 100. In addition, the bus bar 310 may be a sensing bus bar for sensing a voltage of the secondary battery 110 through the contact with the electrode lead. As such, the bus bar 310 may be formed of an electrically conductive material such as copper or aluminum in order to be electrically connected to the electrode lead. Further, the bus bar 310 may be coupled and fixed to the electrode lead by welding or the like in order to stably maintain the contact with the electrode lead.

In particular, in the battery module according to the present disclosure, the sensing block 300 may be coupled to the upper housing 200 by sliding. That is, the sensing block 300 may be configured not only to be coupled to the upper housing 200 but also to slide in a state of being coupled to the upper housing 200. The sliding configuration will be described in more detail with reference to FIG. 3.

Figure 3:
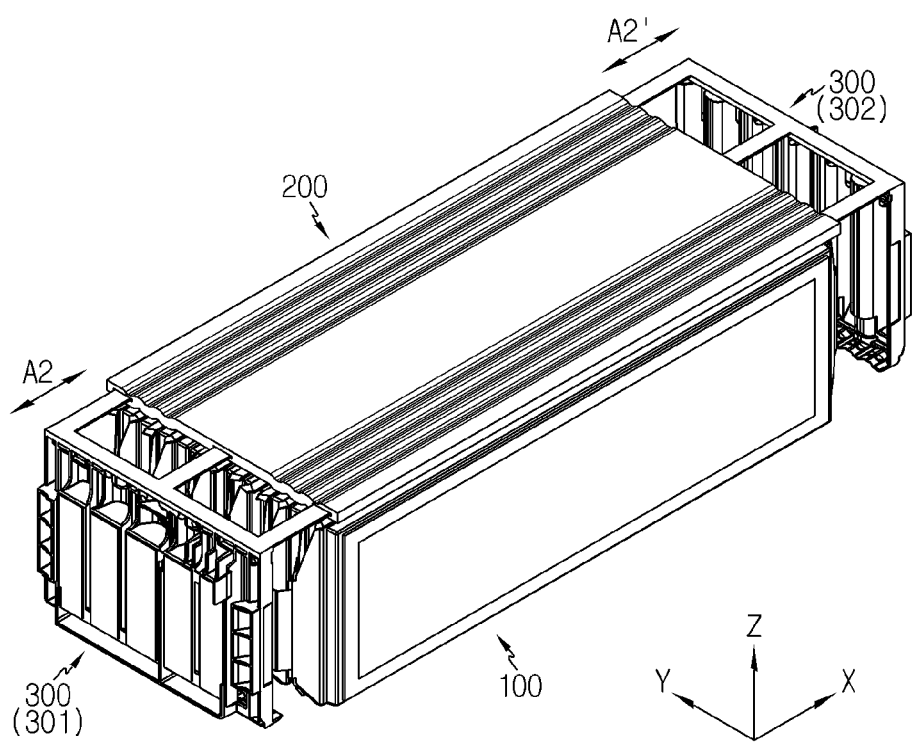
FIG. 3 is perspective view schematically showing that a sensing block slides in the battery module according to an embodiment of the present disclosure.

FIG. 3 is perspective view schematically showing that the sensing block 300 slides in the battery module according to an embodiment of the present disclosure.

Referring to FIG. 3, the sensing block 300 including the sensing bus bar 310 is located at the front side and the rear side of the cell assembly 100, and a top end of the sensing block 300 may be coupled to the upper housing 200. At this time, the sensing block 300 may be configured to be slidable, as indicated by arrows A2 and A2', in a state where the top end thereof is coupled to the upper housing 200.

According to this configuration of the present disclosure, the battery module may be assembled more easily. That is, when the cell assembly 100, the upper housing 200 and the sensing block 300 are coupled to assemble the battery module, as shown in FIG. 2, the sensing block 300 may be located at the front side and/or the rear side of the cell assembly 100 as moving in a downward direction of the upper housing 200 (in the direction of an arrow A1 in the figure) in state of being coupled to the upper housing 200 in advance. Thus, when the upper housing 200 is placed on the upper portion of the cell assembly 100, the sensing block 300 may be simultaneously positioned at the front side and/or the rear side of the cell assembly 100.

Here, when the upper housing 200 is placed on the upper portion of the cell assembly 100, the sensing block 300 may be disposed at the front side and/or the rear side of the cell assembly 100 in a state of being slightly spaced from the electrode lead of the cell assembly 100. Thus, while the upper housing 200 is being mounted to the upper portion of the cell assembly 100 and the sensing block 300 is being moved to the front side and the rear side of the cell assembly 100, it is possible to prevent interference from occurring between the sensing block 300 and the cell assembly 100, particularly between the sensing block 300 and the electrode lead.

Thus, in this case, the assembly process between the upper housing 200 and the cell assembly 100 and between the sensing block 300 and the cell assembly 100 may be performed smoothly.

In particular, the cell assembly 100 may be configured such that the electrode leads protrude at both the front side and the rear side of the cell assembly 100.

That is, the secondary battery 110 may be classified into a bi-directional secondary battery and a unidirectional secondary battery depending on the protruding form of the electrode leads. Here, the bi-directional secondary battery is a secondary battery in which the positive electrode lead and the negative electrode lead protrude in different directions, for example in opposite directions, at the pouch-type secondary battery. Meanwhile, the unidirectional secondary battery may be configured such that the positive electrode lead and the negative electrode lead protrude in the same direction at the pouch-type secondary battery. In the battery module according to the present disclosure, the plurality of secondary batteries included in the cell assembly 100 may be bi-directional secondary batteries, as shown in FIGS. 1 to 3.

If the cell assembly 100 is configured using bi-directional secondary batteries, the assembly process between the sensing block 300 and the electrode lead of the cell assembly 100 may become easier and the structure of the sensing block 300 may be simplified. In other words, since the bi-directional secondary battery has only one electrode lead at one side of the secondary battery, it is possible to increase the size of the electrode lead. Thus, the electrode leads may be connected to each other more easily, and the electrode lead and the sensing bus bar 310 may also be connected to each other more easily. Also, in the bi-directional secondary batteries, the electrode leads of different polarities are located in different directions, especially in opposite directions, and thus it is possible to eliminate interference by electrode leads or bus bars 310, which should not be connected.

If the cell assembly 100 is configured using bi-directional secondary batteries as described above, the sensing block 300 may include two unit blocks as shown in FIGS. 1 to 3. Hereinafter, the unit block located at the front side of the cell assembly 100 is referred to as a front block 301, and the unit block located at the rear side of the cell assembly 100 is referred to as a rear block 302.

The front block 301 and the rear block 302 are respectively coupled to the upper housing 200 and may be configured to be slidable.

For example, in FIG. 3, the front block 301 is located at the front side of the cell assembly 100, and the top end of the front block 301 may be coupled to the front end of the upper housing 200 so as to be slidable in the direction of an arrow A2. Thus, the front block 301 may be configured to move closer to or away from the electrode lead located at the front end of the cell assembly 100 through the sliding movement. That is, if the front block 301 slides inwards, the front block 301 may move close to the front end of the cell assembly 100. Meanwhile, if the front block 301 slides outwards, the front block 301 may move away from the front end of the cell assembly 100. Meanwhile, in this specification, unless otherwise stated, the inward direction refers to a direction toward the center of the battery module, and the outward direction refers to its opposite direction.

In addition, in FIG. 3, the rear block 302 is located at the rear side of the cell assembly 100, and the top end of the rear block 302 may be coupled to the rear end of the upper housing 200 so as to be slidable in the direction of an arrow A2'. Thus, the rear block 302 may be configured to move closer to or away from the electrode lead located at the rear end of the cell assembly 100 through the sliding movement.

According to this configuration of the present disclosure, the sensing block 300 may be assembled more easily for the battery module including bi-directional secondary batteries. In other words, when the battery module is configured using the bi-directional secondary batteries in which the electrode leads are located at both the front end and the rear end, first, as shown in FIG. 2, the front block 301 and the rear block 302 are moved downward together with the upper housing 200 in a state where the front block 301 and the rear block 302 are apart from each other, thereby preventing the front block 301 and the rear block 302 from interfering with the front end and the rear end of the cell assembly 100 during the movement. Then, if the upper housing 200 is appropriately disposed at a proper position on the upper portion of the cell assembly 100, the front block 301 and the rear block 302 located at the front end and the rear end of the cell assembly 100 may move inward to come close to each other. Thus, the front block 301 and the rear block 302 may move close to the front end and the rear end of the cell assembly 100 and be coupled to the electrode leads of the cell assembly 100, as shown in FIG. 1.

Moreover, according to this configuration of the present disclosure, assembling the battery module may be automated more easily. In particular, in case of a conventional battery module, it is difficult to easily automate the process in which the sensing block 300 and the cell assembly 100 move close to each other and are assembled. However, in the present disclosure, as shown in FIGS. 2 and 3 as an example, the sensing bus bar 310 of the sensing block 300 and the electrode lead of the cell assembly 100 may be assembled more easily by moving the upper housing 200 downward and then horizontally moving the sensing block 300 toward the cell assembly 100. At this time, as the upper housing 200 moves in the z-axis direction and the sensing block 300 moves in the x-axis direction, the upper housing 200 and the sensing block 300 may be coupled to the cell assembly 100. Here, the movement in the z-axis direction and the movement in the x-axis direction may be automated without difficulty.

Also, in the battery module according to the present disclosure, the sensing block 300 and the cell assembly 100 may be separated easily. For example, in order to separate the sensing block 300 and the cell assembly 100 from each other in a state where the battery module is assembled, it is just needed to move the front block 301 and the rear block 302 outwards to become away from each other and then lift the upper housing 200 and the sensing block 300 upwards. Thus, in situations where some components need to be replaced or repaired after the use of the battery module, the battery module may be dissembled easily.

Preferably, in the battery module according to the present disclosure, the sensing block 300 may be configured to be slidable along the forward and rearward direction of the cell assembly 100. That is, the sensing block 300 may be disposed at the front side and/or the rear side of the cell assembly 100, and the sensing block 300 may be configured to slide in the forward and rearward direction of the cell assembly 100 (in the ±x-axis direction in the figure).

For example, in FIG. 2, the front block 301 may be configured to move in the inward direction (in the +x-axis direction in the figure) toward the cell assembly 100 to become closer to the electrode lead at the front end of the cell assembly 100, and to move in the outward direction of the cell assembly 100 (in the −x-axis direction) to become away from the electrode lead at the front side of the cell assembly 100. In addition, in FIG. 2, the rear block 302 may be configured to move in the inward direction (in the −x-axis direction) to become close to the electrode lead at the rear end of the cell assembly 100, or to move in the outward direction (in the +x-axis direction) to become away from the electrode lead at the rear end of the cell assembly 100.

Also preferably, the sensing block 300 may further include a bus bar mounting portion and a sliding portion 330. This will be described in more detail with reference to FIG. 4.

Figure 4:
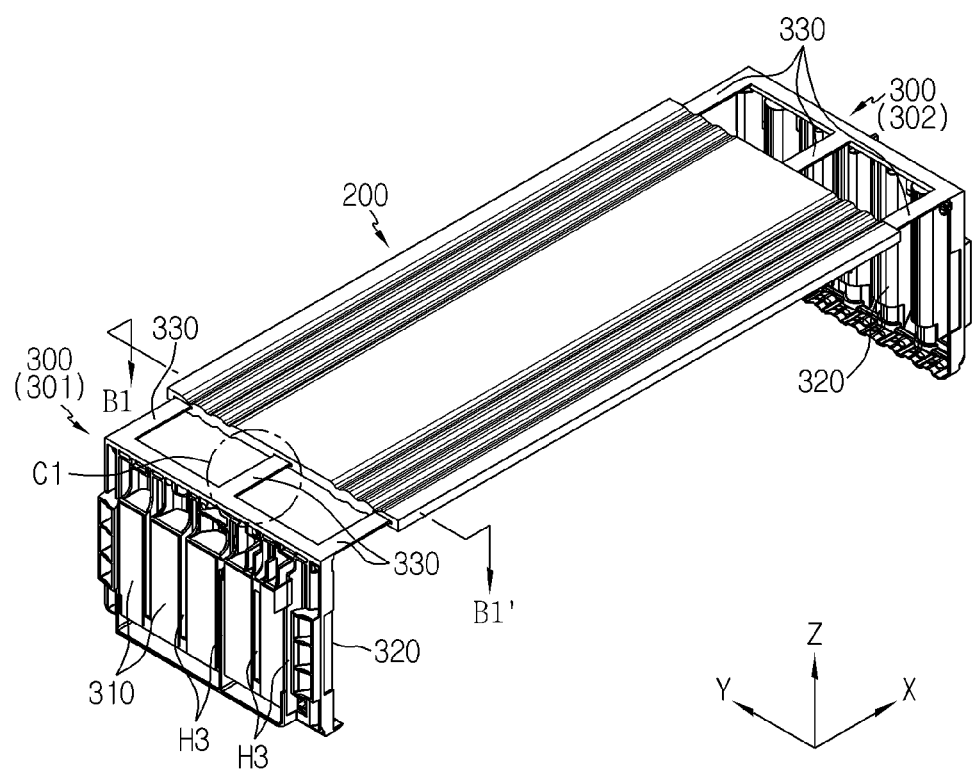
FIG. 4 is a perspective view showing only the sensing block and the upper housing in the battery module according to an embodiment of the present disclosure, while excluding the cell assembly.

FIG. 4 is a perspective view showing only the sensing block 300 and the upper housing 200 in the battery module of FIGS. 1 to 3, while excluding the cell assembly 100.

Referring to FIG. 4, the sensing block 300 may include a bus bar mounting portion 320 and a sliding portion 330.

Here, the bus bar mounting portion 320 is located to at least one of the front side and the rear side of the cell assembly 100 and may be configured so that the bus bar 310 is mounted thereto. In particular, the bus bar mounting portion 320 may have a plate form standing in an approximately upward and downward direction (in the z-axis direction in the figure). Accordingly, the bus bar mounting portion 320 may be configured to have a front surface and a rear surface. However, the front surface and the rear surface of the bus bar mounting portion 320 are not necessarily formed in a flat shape, but may be formed in various shapes such as having unevenness. For example, the bus bar mounting portion 320 may have a bus bar placing groove formed by a concave portion and a convex portion to guide the placing position of the bus bar 310 and also improve the fixing with the bus bar 310.

The bus bar mounting portion 320 may be formed to have a front surface and a rear surface that are substantially parallel to the y-z plane in the figure to cover the front end and/or the rear end of the cell assembly 100. In addition, the bus bar mounting portion 320 may be a portion that moves away from or closer to the cell assembly 100 as the sensing block 300 slides.

The bus bar mounting portion 320 may be made of an electrically insulating material to ensure electrical insulation with the bus bar 310 and the electrode lead. For example, the bus bar mounting portion 320 may be made of a polymer material such as plastic.

The sliding portion 330 is located at an upper portion of the bus bar mounting portion 320 and may be formed to protrude toward the upper housing 200. For example, as shown in FIG. 4, the sliding portion 330 may be formed to protrude from a top end of the bus bar mounting portion 320 toward the upper housing 200.

In addition, the sliding portion 330 may be coupled to the upper housing 200 by sliding. That is, the sliding portion 330 may be configured to be slidable in a state where at least a portion thereof is coupled to the upper housing 200.

As described above, the sliding portion 330 may be a portion coupled to the upper housing 200 by sliding at the sensing block 300. Also, the bus bar mounting portion 320 may be a portion that is positioned at the front side and/or the rear side of the cell assembly 100 at the sensing block 300 and moves closer to or away from the cell assembly 100 as the sliding portion 330 slides.

The sliding portion 330 may be formed in a rod shape elongated in one direction. For example, in FIG. 4, the sliding portion 330 may be formed in a rod shape elongated in the forward and rearward direction (in the x-axis direction), so that one end thereof is connected and fixed to the top end of the bus bar mounting portion 320 and the other end thereof is inserted into the upper housing 200 to slide therein. If the sliding portion 330 is formed in a rod shape, it is possible that the sensing block 300 and the upper housing 200 are coupled easily by sliding, while reducing the volume and weight of the sliding portion 330.

Here, as the sliding portion 330 slides to change the degree of insertion into the upper housing 200, the bus bar mounting portion 320 may move away from or closer to the cell assembly 100. That is, as the sliding portion 330 slides to be inserted more into the upper housing 200, the bus bar mounting portion 320 connected to the sliding portion 330 may be closer to the cell assembly 100. Meanwhile, as the sliding portion 330 slides to be drawn out more from the inside of the upper housing 200, the bus bar mounting portion 320 connected to the sliding portion 330 may be moved away from the cell assembly 100.

At least one sliding portion 330 may be provided in one unit block. In particular, a plurality of sliding portions 330 may be provided in one unit block. For example, in the embodiment in which the front block 301 and the rear block 302 are included in the sensing block 300, the front block 301 and the rear block 302 may include three sliding portions 330, respectively, as shown in FIG. 4.

If the plurality of sliding portions 330 are provided as described above, the coupling between the sensing block 300 and the upper housing 200 may be stably secured, and the sliding movement of the sensing block 300 may be performed more smoothly. In particular, the sliding portions 330 having a rod shape may be configured to be spaced apart from each other by a predetermined distance in the right and left direction. For example, when three sliding portions 330 are provided at the front block 301, each sliding portion 330 may positioned at an upper left end, an upper right end and an upper center of the bus bar mounting portion 320, as shown in FIG. 4. In this case, the sliding movement of the sliding portion 330 may be smoothly performed from the left side to the right side of the sensing block 300 as a whole.

The sliding portion 330 may be made of an electrically insulating material, similar to the bus bar mounting portion 320. For example, the sliding portion 330 may be made of a polymer material such as plastic. In particular, the sliding portion 330 may be integrated with the bus bar mounting portion 320. In other words, the sliding portion 330 may be provided in an integrated form from the initial manufacture, instead of being formed separately from the bus bar mounting portion 320 and then assembled thereto. For example, the sliding portion 330 and the bus bar mounting portion 320 may be manufactured in an integrated form by injection molding.

More preferably, the upper housing 200 may have a guide portion. This will be described in more detail with reference to FIGS. 5 and 6.

Figure 5:
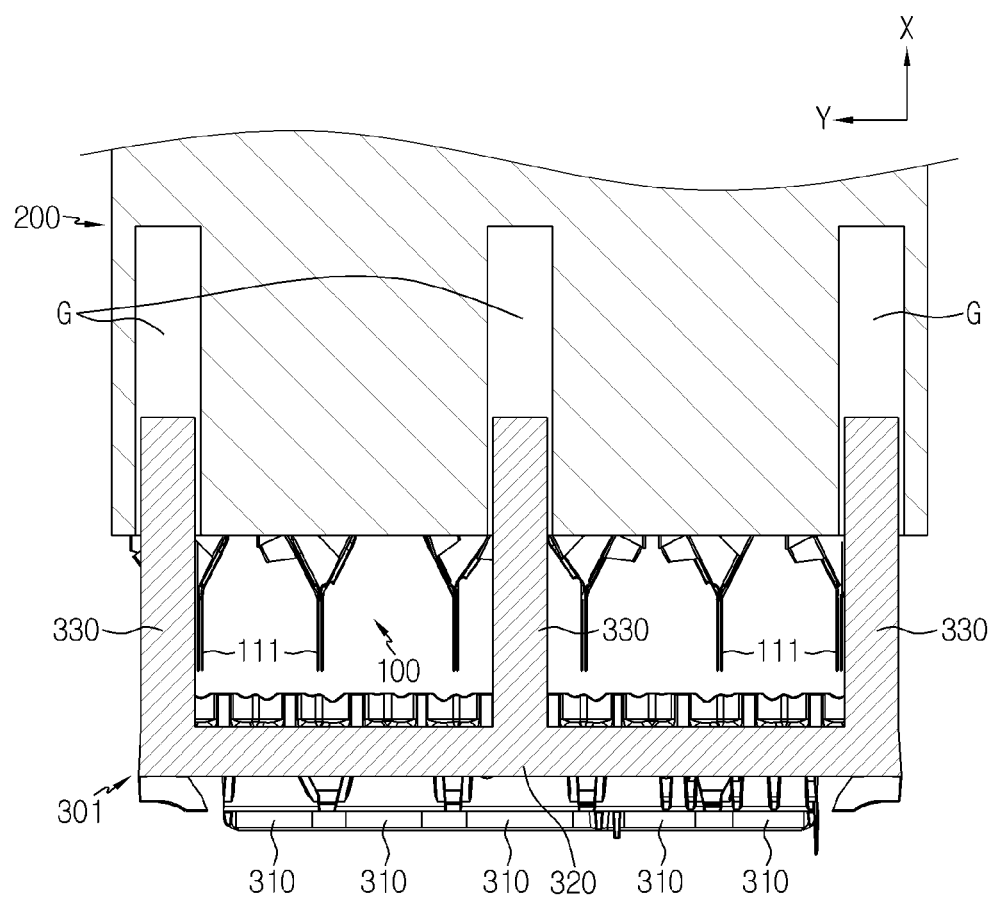
FIGS. 5 and 6 are diagrams schematically showing that the sliding portion of the sensing block moves along a guide portion of the upper housing.
Figure 6:
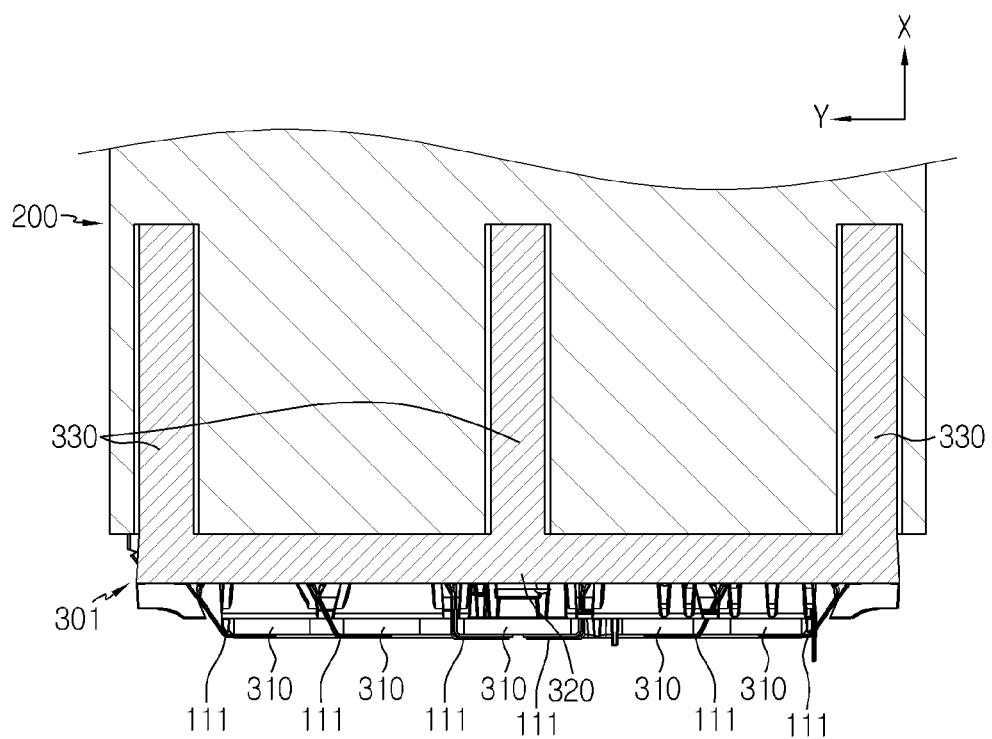

FIGS. 5 and 6 are diagrams schematically showing that the sliding portion 330 of the sensing block 300 moves along a guide portion of the upper housing 200. In particular, FIG. 5 may be regarded as an example of a cross-sectioned view, taken along the line B1-B1' of FIG. 4.

Referring to FIGS. 5 and 6, the upper housing 200 may have a guide portion G. The guide portion G is a passage through which the sliding portion 330 may be inserted and moved, and may be configured so that the inserted sliding portion 330 is movable in the forward and rearward direction of the cell assembly 100 (in the x-axis direction in the figure), namely in the forward and rearward direction of the battery module.

According to this configuration of the present disclosure, since the moving direction of the sliding portion 330 may be guided by the guide portion G, the sensing block 300 may slide smoothly, which may allow the cell assembly 100 and the sensing block 300 to be easily assembled and improve the coupling between the cell assembly 100 and the sensing block 300.

In particular, the guide portion G may be formed in a shape corresponding to the number and position of the sliding portion 330. For example, since three sliding portions 330 are provided in the front block 301 in FIG. 5, three guide portions may also be formed for guiding the sliding portions 330. Also, the guide portions G may be formed at a left portion, a right portion and a center portion of the upper housing 200 to correspond to the positions of the sliding portions 330.

Here, the guide portion G may be formed in a hollow shape elongated in the forward and rearward direction in the upper housing 200.

For example, the guide portion may have holes formed at a front surface side and a rear surface side of the upper housing 200, and the holes may be elongated into the upper housing 200 along the forward and rearward direction of the battery module (in the x-axis direction in the figure). In this case, the sliding portion 330 of the sensing block 300 may inserted along the hole (hollow) formed as a guide portion in the upper housing 200 and slide along the hole.

Further, if the sensing block 300 includes the front block 301 and the rear block 302, the guide portion for coupling the sliding portion 330 of the front block 301 and the sliding portion 330 of the rear block 302 may also be formed in the upper housing 200, respectively. At this time, the guide portion for guiding the sliding portion 330 of the front block 301 may be referred to as a front guide portion, and the guide portion for guiding the sliding portion 330 of the rear block 302 may be referred to as a rear guide portion. In this case, the front guide portion may be a hollow having an open front end and elongated rearwards (in the +x-axis direction in the figure) from the front end of the upper housing 200. Also, the rear guide portion may be a hollow having an open rear end and elongated forwards (in the −x-axis direction in the drawing) from the rear end of the upper housing 200.

According to this configuration of the present disclosure, it is possible to minimize that the sliding portion 330 is exposed to the outside of the upper housing 200. Further, in this case, it is possible to prevent or reduce that the sliding portion 330 is exposed above the cell assembly 100. Accordingly, when the sliding portion 330 is driven to slide, the sliding portion 330 is not interfered with the upper portion of the cell assembly 100, thereby ensuring smooth sliding of the sliding portion 330, and it is possible to prevent the cell assembly 100 or the sliding portion 330 from being damaged due to the sliding. Moreover, since the sliding portion 330 is needed to just move along the hollow of the upper housing 200, the sliding of the sliding portion 330 may be guided more smoothly. In this case, the coupling force between the sensing block 300 and the upper housing 200 may be further strengthened.

In addition, the battery module according to the present disclosure may further include a sensing cable. This will be described in more detail with reference to FIG. 7.

Figure 7:
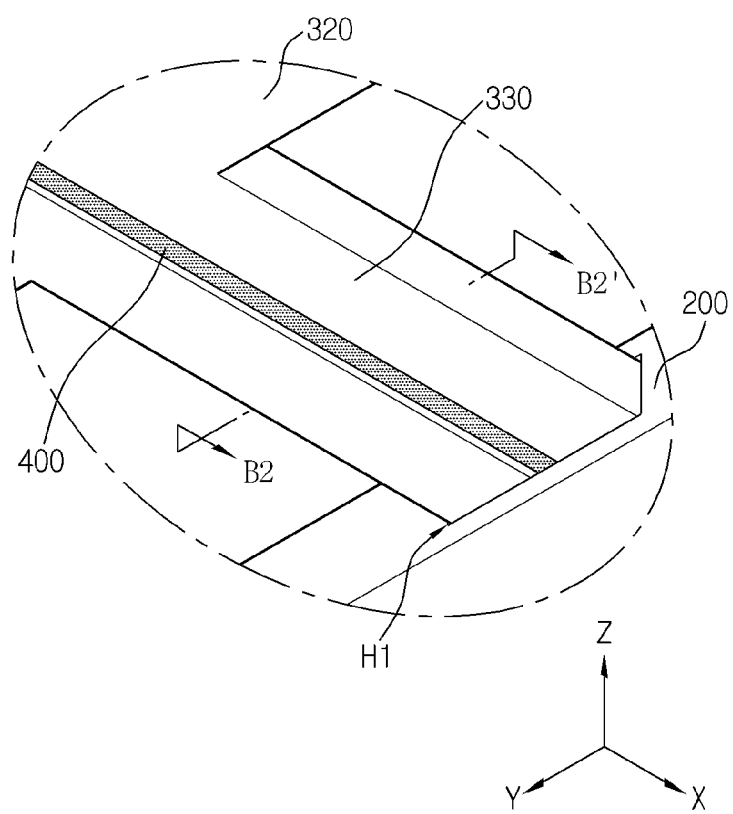
FIG. 7 is a perspective view schematically showing a partial configuration of the battery module according to an embodiment of the present disclosure, observed from the below.

FIG. 7 is a perspective view schematically showing a partial configuration of the battery module according to an embodiment of the present disclosure, observed from the below. For example, FIG. 7 may be regarded as a diagram showing a portion C1 of FIG. 4, observed from the below. Also FIG. 8 is a cross-sectioned view, taken along the line B2-B2' of FIG. 7.

The sensing cable 400 is a wire capable of transmitting current or electric signals, and, in particular, may provide a path for transmitting information sensed by the bus bar. To this end, one end of the sensing cable 400 may be electrically connected to the bus bar 310. In addition, the other end of the sensing cable 400 may be connected to a part to be connected to another component, for example a connector terminal provided at the sensing block 300. In this case, the connector terminal provided at the sensing block 300 may be connected to another component outside the battery module, such as a battery management system (BMS), through a connection member. Then, the voltage information or the like of each secondary battery 110 sensed by the bus bar may be transmitted to an external component via the sensing cable 400, the connector terminal and the connection member.

The sensing cable 400 may be formed to elongate in one direction. In particular, in the present disclosure, the sensing cable 400 may be elongated in the forward and rearward direction of the cell assembly 100, namely in the forward and rearward direction of the battery module. Further, in the sensing block 300 including the front block 301 and the rear block 302, the connector terminal may be provided at any one unit block, for example the front block 301 only. In this case, the sensing cable 400 connected to the bus bar provided at the rear block 302 may be elongated from the rear end of the cell assembly 100 to the front end of the cell assembly 100.

Figure 8:
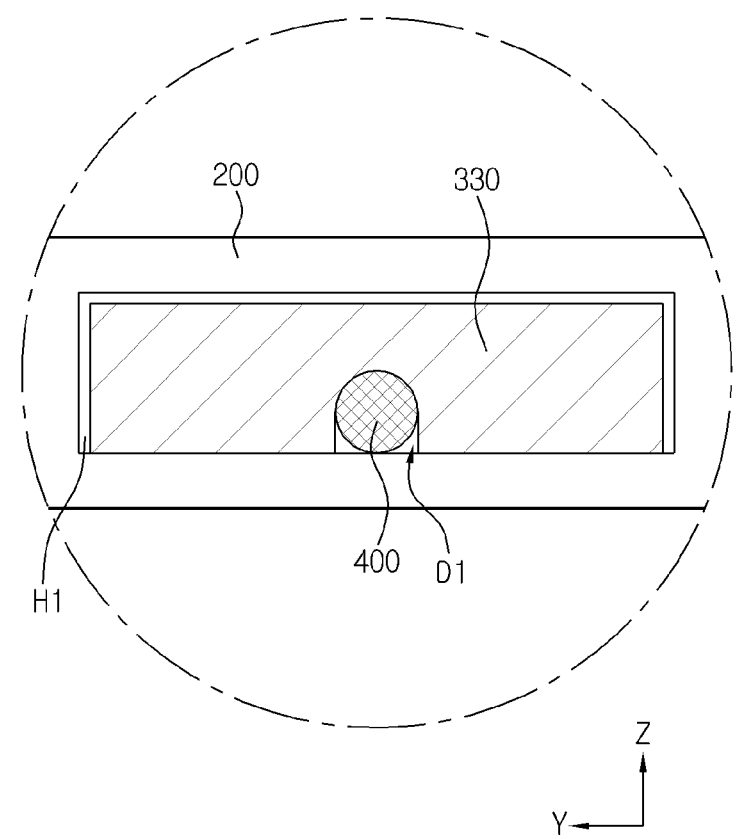
FIG. 8 is a cross-sectioned view, taken along the line B2-B2' of FIG. 7.

As shown in FIGS. 7 and 8, the sensing cable 400 may be configured such that at least a portion of the sensing cable 400 is positioned under the sliding portion 330. Particularly, when the sliding portion 330 is slid in the longitudinal direction along a hollow H1 of the upper housing 200, a portion not inserted into the hollow H1 may be positioned below the sliding portion 330. According to this configuration of the present disclosure, it is possible to minimize exposure of the sensing cable 400, thereby protecting the sensing cable 400 and simplifying the structure of the battery module.

At least a portion of the sensing cable 400 may be inserted into the sliding portion 330.

For example, as shown in FIG. 8, a groove having an upwardly concave shape may be formed at the lower portion of the sensing cable 400, as indicated by D1. In this case, the sensing cable 400 may be inserted into the groove D1 of the sliding portion 330.

According to this configuration of the present disclosure, it is possible to prevent that the sensing cable 400 is sandwiched between the sliding portion 330 and the upper housing 200 when the sliding portion 330 is driven to slide. Accordingly, the sliding portion 330 may slide smoothly, and it is possible to prevent the sensing cable 400 from being damaged. Also, according to this configuration of the present disclosure, since the exposure of the sensing cable 400 is reduced, it is possible to protect the sensing cable 400 more effectively and reduce interference with other components such as the cell assembly 100.

Meanwhile, in the embodiment of FIGS. 7 and 8, it is illustrated that the sensing cable 400 is inserted into the groove D1 of the sliding portion 330, but it is also possible that the sensing cable 400 is inserted into the hole of the sliding portion 330 or embedded in the sliding portion 330. For example, a hole may be formed in the sliding portion 330 along the forward and rearward direction (along the x-axis direction in the figure), and the sensing cable 400 may be inserted into the hole to minimize the exposure of the sensing cable 400. Alternatively, the sensing cable 400 may be formed to be fixedly coupled to the sliding portion 330 by injection-molding the sliding portion 330 in a state where at least a part of the sensing cable 400 is embedded therein.

The sensing cable 400 may be inserted into the upper housing 200 or may be located at the upper portion or the lower portion of the upper housing 200.

In addition, the sensing cable 400 may be configured to have a length variable along the forward and rearward direction of the cell assembly 100. This will be described in more detail with reference to FIG. 9.

Figure 9:
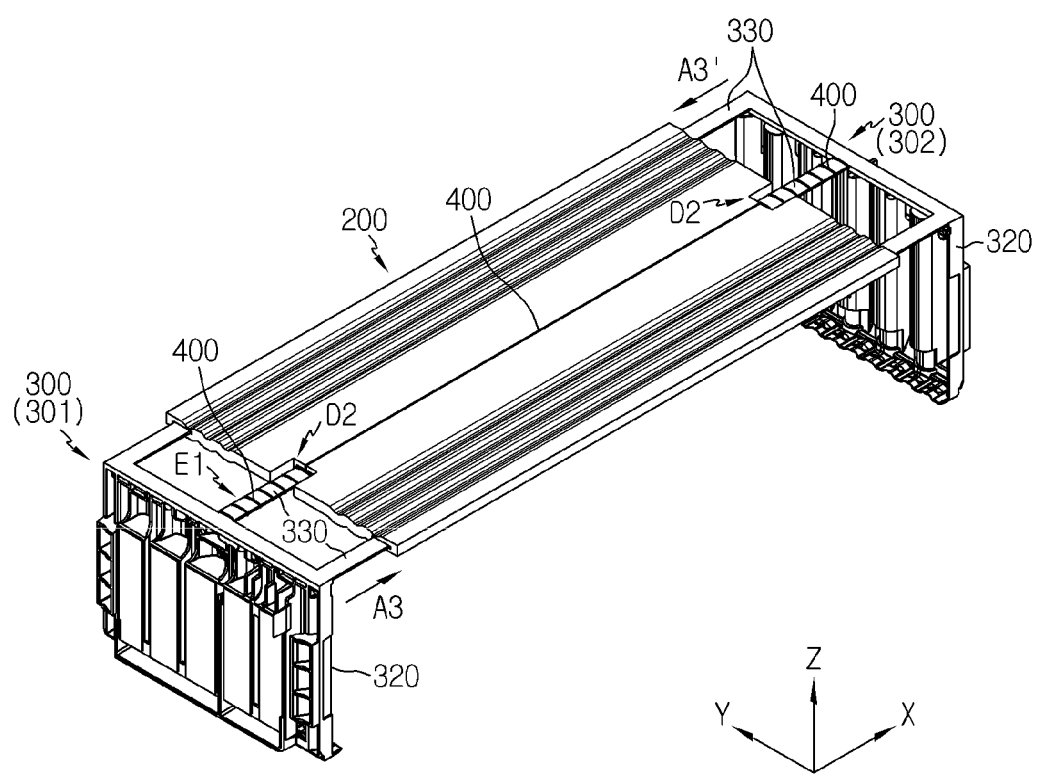
FIGS. 9 and 10 are perspective views showing a partial configuration of a battery module according to another embodiment of the present disclosure.
Figure 10:
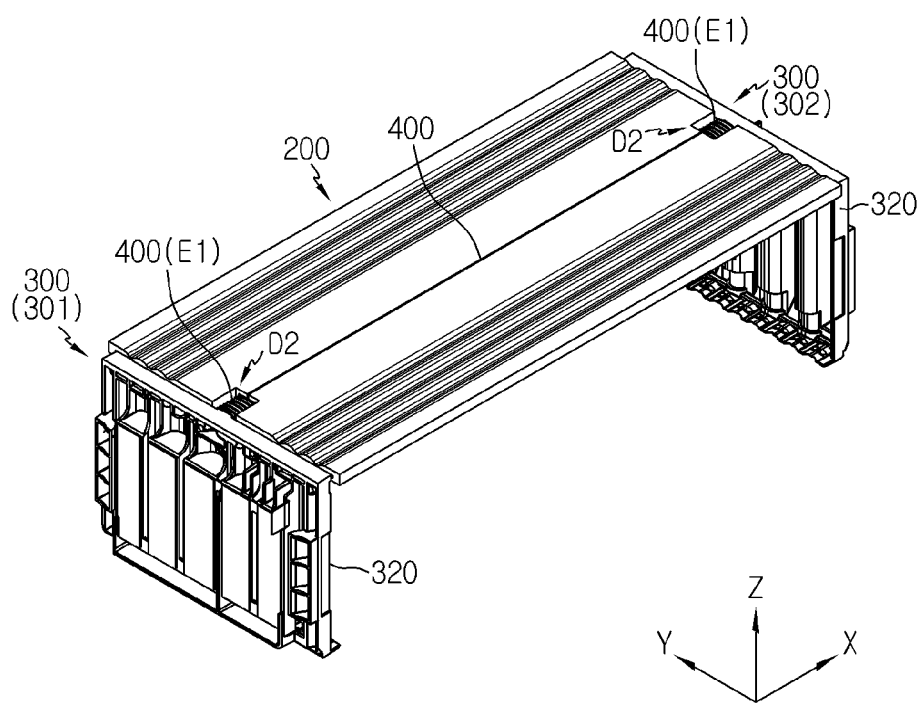

FIGS. 9 and 10 are perspective views showing a partial configuration of a battery module according to another embodiment of the present disclosure. In FIGS. 9 and 10, the cell assembly 100 is also not depicted for convenience of explanation. Any features identical or similar to those of the former embodiment will not be described in detail, and different features will be mainly described. In addition, in other embodiments below, different features will be mainly described, similar to the above.

Referring to FIGS. 9 and 10, a sensing cable 400 is included in the battery module, and the sensing cable 400 may have a variable portion, as indicated by E1 in the figures. The variable portion E1 may be a portion of the sensing cable 400 that has a length variable in the forward and rearward direction (in the x-axis direction of the figure). In particular, the sensing block 300 according to the present disclosure may be coupled to the upper housing 200 by sliding. Here, the variable portion E1 may be a portion of the sensing cable 400 that changes in length in the sliding direction when the sensing block 300 slides.

In particular, as shown in FIGS. 9 and 10, the variable portion E1 may be formed in a coil form. Further, the variable portion E1 may be configured to wind the sliding portion 330 along the outer surface of the sliding portion 330. At this time, if the sensing block 300 moves outward to be away from the cell assembly 100, as shown in FIG. 9, the variable portion E1 of the sensing cable 400 may represent a stretched coil shape. Meanwhile, if the sensing block 300 moves inwards (in the direction A3 and A3' in FIG. 9) to be close to the cell assembly 100, as shown in FIG. 10, the variable portion of the sensing cable 400 may represent a compressed coil shape.

According to this configuration of the present disclosure, most of the sensing cable 400, except the variable portion E1, may not move while the sensing block 300 is sliding. For example, one end of the coil-shaped variable portion E1 may be fixed to the sliding portion 330 of the sensing block 300, and the other end of the variable portion may be fixed to the upper housing 200. In this case, when the sensing block 300 slides, only the coil is changed to be compressed or stretched, and most of the other regions of the sensing cable 400 may not move. For example, in FIGS. 9 and 10, the sensing cable 400 between the front block 301 and the rear block 302 may be located at the upper portion of the upper housing 200. Here, even though the sensing block 300 moves inward or outward, the region located at the upper portion of the upper housing 200 may be fixed without moving. Thus, it is possible to prevent the sensing cable 400 from being damaged or disturbing the sliding of the sensing block 300 due to the movement of the sensing cable 400. Further, when the sensing block 300 slides, it is possible to prevent the sensing cable 400 from being twisted or protruded to an unintentional position and thus damaging the sensing cable 400 or other components such as the electrode lead 111.

In this configuration, the upper housing 200 may have a coil insert groove that is concave in an inward horizontal direction. For example, the upper housing 200 may have a coil insert groove that is concave in rear horizontal direction (in the +x-axis direction in the figure), at the front end thereof, as indicated by D2 in FIGS. 9 and 10. In this case, at least a portion of the variable portion E1 having a coil form in the sensing cable 400 may be inserted into the coil insert groove D2. In particular, in a state where the variable portion E1 having a coil form is compressed, this compressed variable portion E1, namely the compressed coil, may be inserted into the coil insert groove D2 of the upper housing 200, as shown in FIG. 10.

According to this configuration of the present disclosure, a space may be given so that the variable portion E1 having a coil form is accommodated in the upper housing 200, and also the length of the variable portion E1 may be easily changed as the sensing block 300 moves. Also, according to this configuration of the present disclosure, the bus bar mounting portion 320 of the sensing block 300 is closely adhered and contacted to the cell assembly 100 as much as possible, thereby preventing the volume of the battery module from increasing and allowing easier coupling of the bus bar and the electrode lead 111. In addition, in this case, it is possible to prevent a gap from being formed between the bus bar mounting portion 320 and the upper housing 200, thereby preventing a physical or chemical exterior factor from being introduced through the gap at the upper side of the battery module.

Meanwhile, the sensing cable 400 having a variable length may be implemented in various forms other than the coil type as described above.

Figure 11:
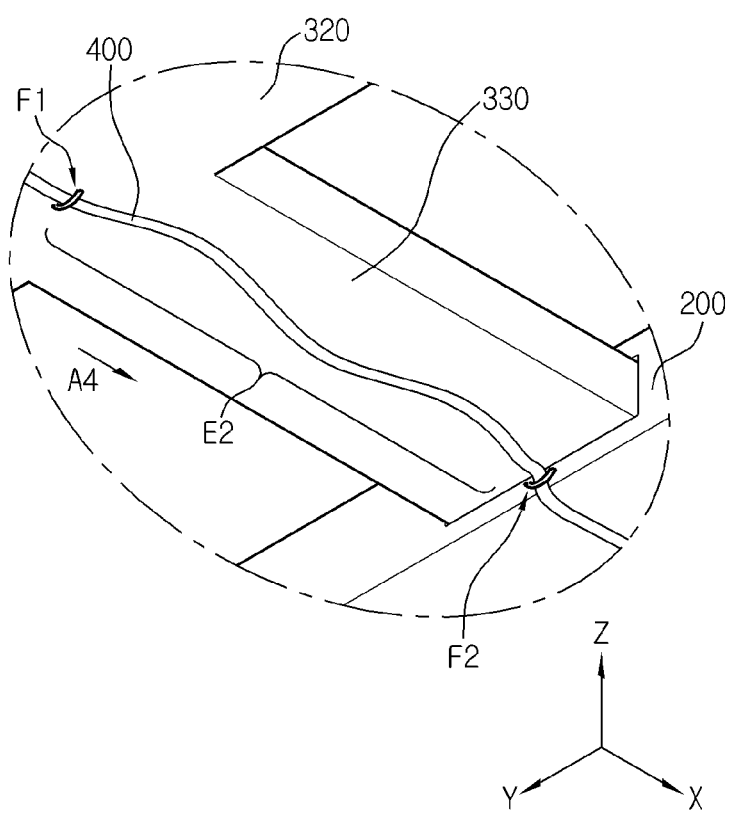
FIGS. 11 and 12 are perspective views showing a partial configuration of a battery module according to still another embodiment of the present disclosure, observed from the below.
Figure 12:
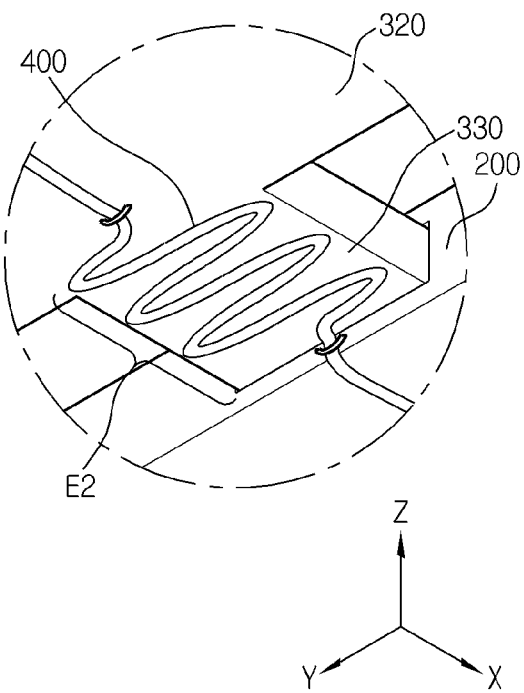

FIGS. 11 and 12 are perspective views showing a partial configuration of a battery module according to still another embodiment of the present disclosure, observed from the below. For example FIGS. 11 and 12 may be regarded as another embodiment of FIG. 7.

First, referring to FIG. 11, both ends of the variable portion of the sensing cable 400 may be fixed, as indicated by F1 and F2 in the figure. In particular. F1 may be a portion fixed to the sensing block 300, and F2 may be a portion fixed to the upper housing 200. In the sensing cable 400, a portion of the sensing cable 400 between the portion F1 and the portion F2, namely a portion denoted by E2, is the variable portion whose length is variable in the x-axis direction. In particular, in this embodiment, the variable portion E2 may be configured to be bent in a wave shape horizontally in the left and right direction (in the y-axis direction in the figure), as shown in the figure. For example, if the bus bar mounting portion 320 moves toward the upper housing 200 as indicated by an arrow A4 in FIG. 11, the degree of bending of the variable portion E2 is further intensified, and then, as shown in FIG. 12, the variable portion E2 may be configured in a compressed zigzag form with a greater degree of bending.

According to this configuration of the present disclosure, even though the sensing block 300 is sliding, the remaining portion of the sensing cable 400 except the variable portion E2 may not be moved. In particular, the sensing cable 400 may be located at the lower portion of the upper housing 200 as described above at the other end of the variable portion. According to this embodiment, even when the sensing block 300 slides as indicated by an arrow A4, the portion of the sensing cable 400 located below the upper housing 200 may be fixed without moving. Thus, when the sensing block 300 slides, it is possible to prevent the sensing cable 400 from being jammed, damaged, approaching other components, or the like. Further, according to this configuration, the variable portion E2 of the sensing cable 400 may be provided only at one side based on the sliding portion 330, for example at the lower portion of the sliding portion 330. Accordingly, it is possible to reduce the exposure of the sensing cable 400 in a predetermined direction, for example in the upward direction, and to prevent the battery module from becoming bulky or complicated due to the variable portion E2 of the sensing cable 400.

Meanwhile, though not shown in the figures, in the configuration of FIGS. 11 and 12, the groove indicated by D2 in FIGS. 9 and 10 may also be formed. In this case, the sensing cable 400 compressed in a wave form or a zigzag form may be inserted into the groove. Thus, similar to the former embodiment, the bus bar mounting portion 320 and the upper housing 200 may be more closely adhered to each other, thereby eliminating a gap therebetween.

In the battery module according to the present disclosure, a bus bar may be mounted to the outer side of the sensing block 300. For example, as shown in FIG. 4, the bus bar provided at the front block 301 may be located at the front side of the bus bar mounting portion 320.

In this case, the sensing block 300 may have a perforation hole through which the electrode lead 111 passes. That is, in FIG. 4, the bus bar mounting portion 320 may have a perforation hole, as indicated by H3. In addition, through the perforation hole H3, the electrode lead 111 of the cell assembly 100 located at the inside may be brought into contact with the bus bar located at the outer side (at the front side) through the bus bar mounting portion 320.

In particular, the perforation hole H3 may be formed so that the electrode lead 111 may pass therethrough in a standing form. That is, as shown in FIG. 5, the electrode lead 111 of the cell assembly 100 has a plate shape erected in an upward and downward direction to pass through the perforation hole H3 of the sensing block 300. Thus, the perforation hole H3 of the sensing block 300 may have a slit shape which is long in the upward and downward direction (in the z-axis direction in the figure) and is short in the right and left direction (in the y-axis direction in the figure). However, the electrode lead 111 of the cell assembly 100 passes through the perforation hole of the sensing block 300 in the standing form, and, after passing through the perforation hole, the electrode lead 111 of the cell assembly 100 may be bent as shown in FIG. 6 to come into contact with the bus bar having both surfaces facing forward and backward. That is, the electrode lead 111 may be regarded as passing through the sensing block 300 in a standing state so that both surfaces thereof are oriented in the right and left direction, and as coming into contact with the bus bar in a standing state so that both surfaces thereof are oriented in the right and left direction.

According to this configuration of the present disclosure, the volume of the battery module may be reduced by closely adhering the sensing block 300 and the cell assembly 100 further. Also, according to this configuration of the present disclosure, the coupling between the cell assembly 100 and the sensing block 300 may be further improved. In addition, it is possible to minimize exposure of the cell assembly 100 to the outside through the perforation hole by reducing the size of the perforation hole.

In particular, according to an embodiment of the present disclosure, when the sensing block 300 slides, the electrode lead 111 passes through the sensing block 300 in a standing state where both surfaces thereof are oriented in the right and left direction, and, after passing through the sensing block 300, the electrode lead 111 may be bent to come into contact with the bus bar. Thus, the battery module may be assembled easily, and further, it may be advantageous for automated assembling of the battery module.

Figure 13:
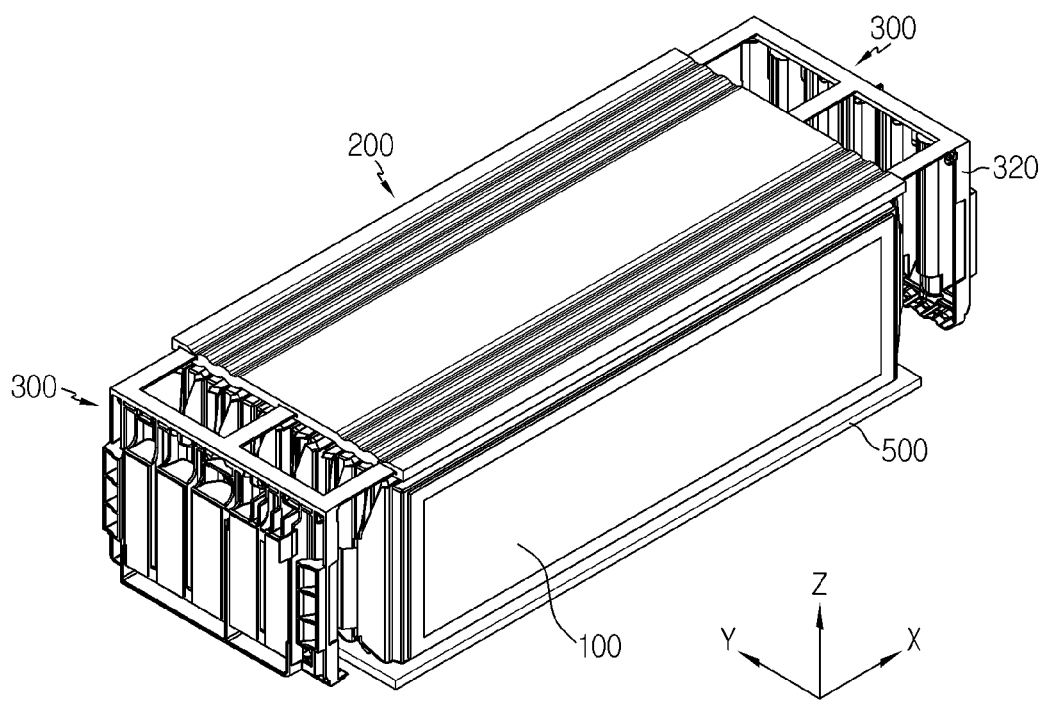
FIG. 13 is a perspective view schematically showing a battery module according to another embodiment of the present disclosure.

FIG. 13 is a perspective view schematically showing a battery module according to another embodiment of the present disclosure.

Referring to FIG. 13, the battery module may further include a cooling plate 500. The cooling plate 500 has a plate shape and may be made of a thermally conductive material such as a metal. Also, the cooling plate 500 may be disposed below the cell assembly 100 to absorb the heat of the cell assembly 100. In this case, a cooling channel may be formed at a portion of the battery module adjacent to the cooling plate 500, such as a lower portion of the cooling plate 500, so that a cooling fluid such as cooling water or air flows therethrough.

In this configuration, the sensing block 300 can be configured to be coupled to the cooling plate 500. In particular, the sensing block 300 may be configured to be coupled to the cooling plate 500 by sliding. This will be described in more detail with reference to FIGS. 14 to 16.

Figure 14:
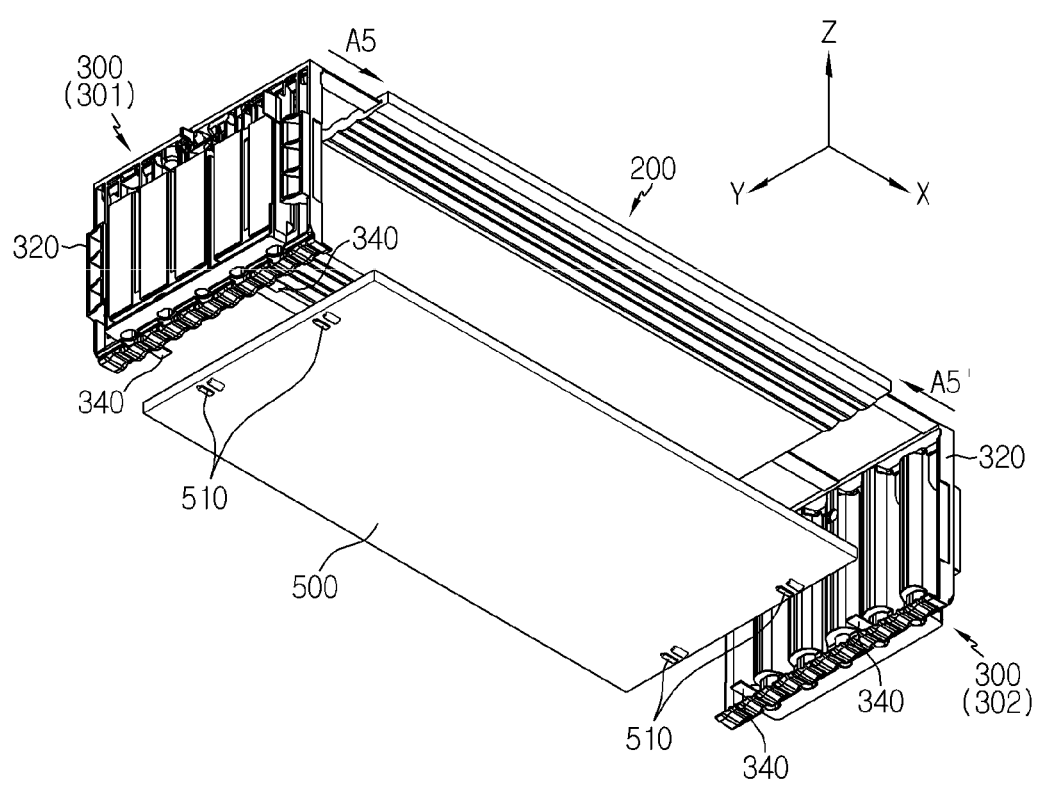
FIG. 14 is a perspective view showing the battery module of FIG. 13, observed from the below.
Figure 15:
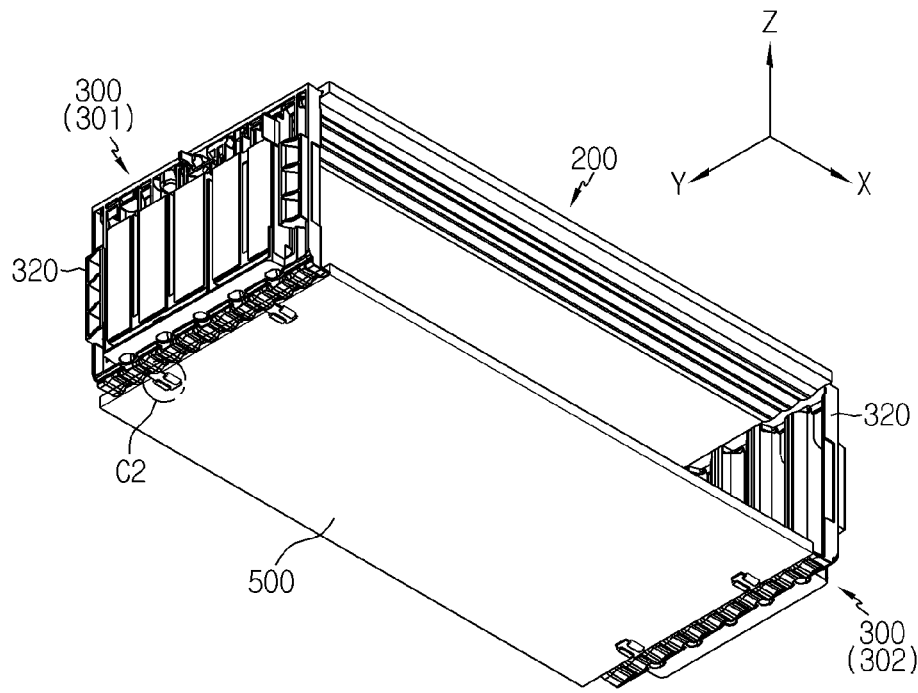
FIG. 15 is a perspective view showing that the sensing block of FIG. 14 is moved so that the sensing block and the cooling plate are coupled, observed from the below.

FIG. 14 is a perspective view showing the battery module of FIG. 13, observed from the below, and FIG. 15 is a perspective view showing that the sensing block 300 of FIG. 14 is moved so that the sensing block 300 and the cooling plate 500 are coupled, observed from the below. However, for the convenience of explanation, the cell assembly 100 is not depicted in FIGS. 14 and 15. Also, FIG. 16 is an enlarged view showing a portion C2 of FIG. 15.

First, referring to FIG. 14, the sensing block 300 may further include an auxiliary coupling portion 340 provided at a lower portion thereof to protrude toward the cooling plate 500. In particular, the auxiliary coupling portion 340 provided at the front block 301 may be configured to protrude in the horizontal direction parallel to the plane of the cooling plate 500, in a rearward direction (in the (+x-axis direction in the figure) from the lower portion of the bus bar mounting portion 320. In addition, the auxiliary coupling portion 340 provided at the rear block 302 may protrude in the horizontal direction from the lower portion of the bus bar mounting portion 320 in the forward direction (in the −x-axis direction in the figure). At this time, if the front block 301 and the rear block 302 are apart as far as possible, the distance between the auxiliary coupling portion 340 of the front block 301 and the auxiliary coupling portion 340 of the rear block 302, as well as the distance between the front block 301 and the rear block 302, may be longer than the length of the cell assembly 100 in the forward and rearward direction (in the x-axis direction in the figure) and the length of the cooling plate 500 in the forward and rearward direction. Thus, even when the auxiliary coupling portion 340 is formed at the sensing block 300, the cell assembly 100 and the cooling plate 500 may be inserted into the space between the sensing blocks 300. Meanwhile, the auxiliary coupling portion 340 may have a rod shape elongated in the forward and rearward direction of the battery module as shown in the figure.

In this configuration, the cooling plate 500 may include an auxiliary insert portion 510 so that the auxiliary coupling portion 340 of the sensing block 300 may be inserted therein. For example, as shown in the figure, the cooling plate 500 may include an auxiliary insert portion 510 provided at a lower portion thereof. The auxiliary coupling portion 340 may be inserted into the auxiliary insert portion 510, and the inserted auxiliary coupling portion 340 may move in the forward and rearward direction (in the x-axis direction in the figure) of the battery module.

Figure 16:
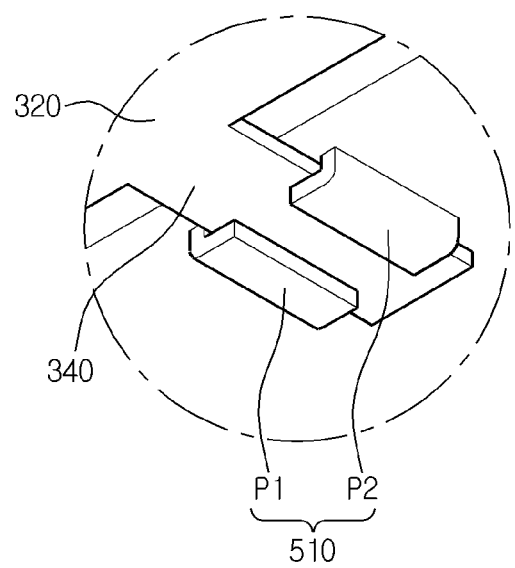
FIG. 16 is an enlarged view showing a portion C2 of FIG. 15.

In addition, if the cell assembly 100 and the cooling plate 500 are positioned at proper locations to be assembled into a battery module, the front block 301 and the rear block 302 move closer to each other in the directions of arrows A5 and A5', and the auxiliary coupling portion 340 of the sensing block 300 and the auxiliary insert portion 510 of the cooling plate 500 may be coupled to each other by insertion, as shown in FIGS. 15 and 16.

Referring to FIGS. 15 and 16, two protrusions P1, P2 are provided at the lower surface of the cooling plate 500, and the protrusions P1, P2 may be arranged to be spaced apart from each other in the right and left direction (in the y-axis direction in the figure). At this time, the two protrusions P1, P2 may be separated in the right and left direction by a distance such that the auxiliary coupling portion 340 may be inserted therein. In addition, the two protrusions P1, P2 may be configured to protrude in the downward direction (in the −z-axis direction in the figure) and be bent to face each other at a position that is spaced apart from the lower surface of the cooling plate 500 by a predetermined distance. The auxiliary insert portion 510 of the cooling plate 500 may be formed by bending the two protrusions P1, P2. In this case, the auxiliary coupling portion 340 of the sensing block 300 may be inserted into the auxiliary insert portion 510 and be slidable in the forward and rearward direction of the battery module (in the x-axis direction in the figure) in the inserted state. That is, the auxiliary insert portion 510 may be configured such that the auxiliary coupling portion 340 is inserted as the sensing block 300 approaches and is movable in the forward and rearward direction.

With this configuration of the present disclosure, the sensing block 300 may be fixed more securely inside the battery module. That is, since the sensing block 300 is coupled to the upper housing 200 and the cooling plate 500 through the sliding portion 330 at the upper portion and the auxiliary coupling portion 340 at the lower portion, both the upper portion and the lower portion of the sensing block 300 are fixed, thereby stably securing the coupling of the sensing block 300 even though an impact or vibration is applied to the battery module.

In addition, according to this configuration of the present disclosure, the sensing block 300 may slide more smoothly. That is, since the sliding positions at the upper portion and the lower portion of the sensing block 300 are guided by the sliding portion 330 and the auxiliary coupling portion 340, the sensing block 300 may slide at an accurate position. Thus, the cell assembly 100 and the sensing block 300 may be assembled more easily. In particular, the process of allowing the electrode bar 111 of the cell assembly 100 to contact the bus bar through the sensing block 300 may be performed more easily.

Meanwhile, in this embodiment, it has been described that the auxiliary insert portion 510 is formed by two bending protrusions P1, P2 provided at the lower portion of the cooling plate 500, and the auxiliary coupling portion 340 having a rod shape is inserted into the auxiliary insert portion 510 by sliding. However, the sensing block 300 and the cooling plate 500 may be coupled in various other ways. For example, the auxiliary insert portion 510 may be formed as a hole elongated in the forward and rearward direction (in the x-axis direction in the figure) at the lower portion of the cooling plate 500, or may be formed as a hollow elongated inside the cooling plate 500 in the forward and rearward direction.

Meanwhile, though not shown in the figures, the cooling plate 500 may have an uneven portion formed at the upper surface and/or the lower surface thereof. The uneven portion may be formed in a shape corresponding to the lower portion of the cell assembly 100 that is in contact with the cooling plate 500. In particular, if the uneven portion is formed at the upper surface, the cooling plate 500 may stably maintain the standing state of each secondary battery 110 of the cell assembly 100 and absorb the heat of each secondary battery 110 more effectively. In addition, if the uneven portion is formed at the lower surface, the cooling plate 500 may more efficiently transmit heat to the cooling fluid at a lower portion.

Also preferably, the sensing block 300 may further include a stopper. Here, the stopper may limit the sliding distance of the sensing block 300 within a predetermined distance.

Figure 17:
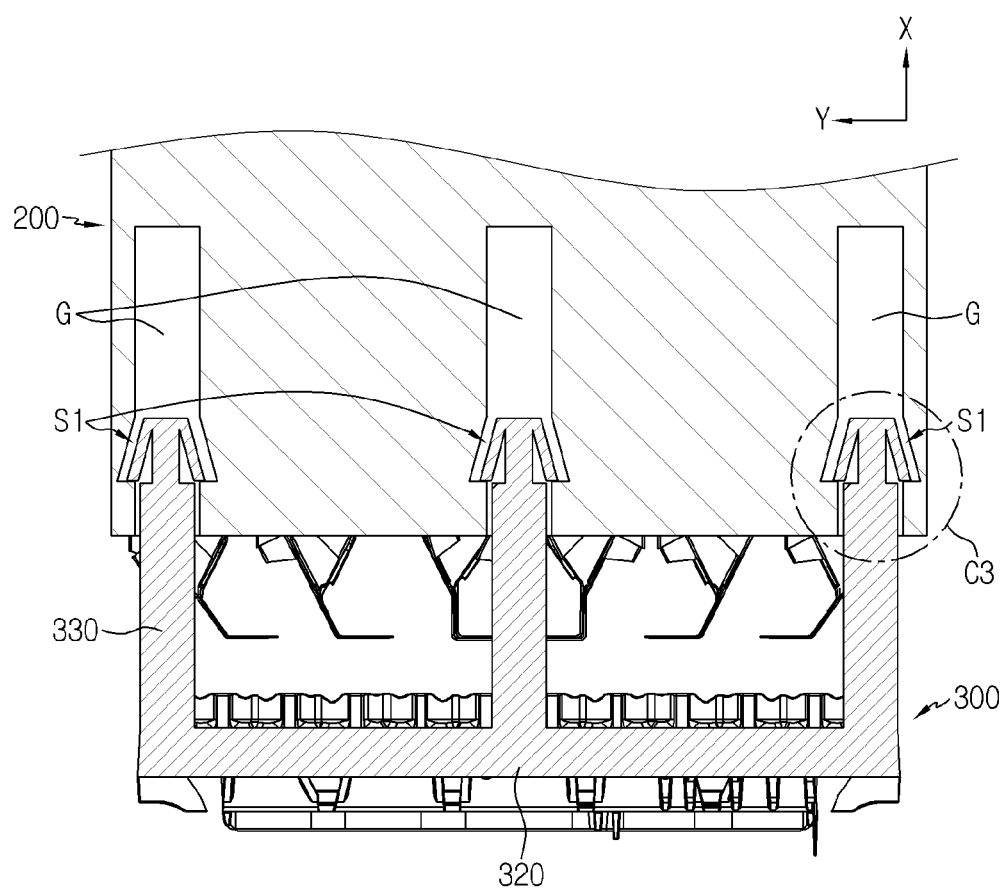
FIG. 17 is a top cross-sectioned view schematically showing a partial configuration of a battery module according to an embodiment of the present disclosure, which includes a sensing block having a stopper.
Figure 18:
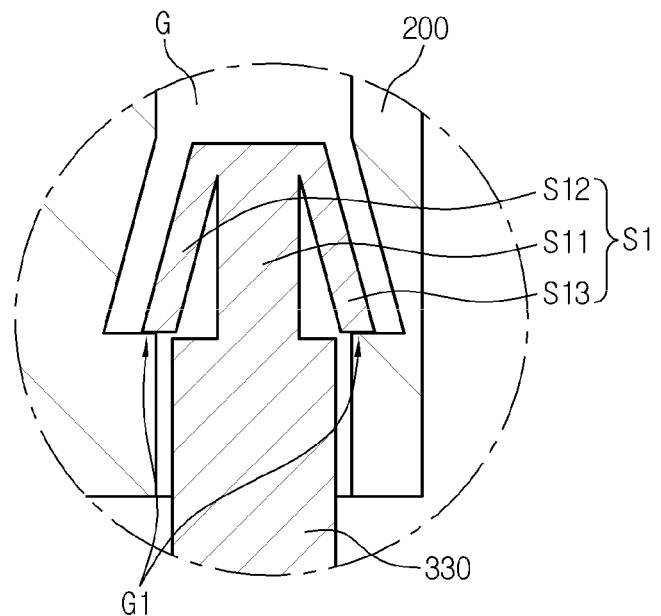
FIG. 18 is an enlarged view showing a portion C3 of FIG. 17.

FIG. 17 is a top cross-sectioned view schematically showing a partial configuration of a battery module according to an embodiment of the present disclosure, which includes a sensing block 300 having a stopper, and FIG. 18 is an enlarged view showing a portion C3 of FIG. 17. In particular, FIG. 17 may be regarded as a modified example of the embodiment of FIG. 5.

Referring to FIGS. 17 and 18, a stopper may be formed at one side of the sliding portion 330 of the sensing block 300, for example at an end of the sliding portion 330, as indicated by S1. At this time, the stopper may include a body portion S11, and a left wing portion S12 and a right wing portion S13 located at a left side and a right side of the body portion S11, respectively. Here, only ends of the left wing portion S12 and the right wing portion S13 are connected to the body portion S11, and the remaining portions thereof may be spaced apart from the body portion S11. In particular, the left wing portion S12 and the right wing portion S13 may be configured such that they are gradually away from each other in the outward direction (in the −x-axis direction in the figure) from the ends thereof, for example in an arrow shape.

In this configuration, the upper housing 200 may be configured to limit the movement of the stopper at a predetermined position. For example, as shown in FIG. 17 if the guide portion G is formed inside the upper housing 200, a step may be formed at one side of this guide portion, as indicated by G1 in FIG. 18. The step G1 may block the wing portions S12, S13 of the stopper S1 so that the sliding portion 330 is prevented from moving in the outward direction (in the −x-axis direction in the figure) any more. Thus, according to this configuration, it is possible to prevent the sensing block 300 from being separated from the upper housing 200 while the battery module is being assembled, repaired or used. Therefore, in this case, the battery module may be assembled and coupled more efficiently.

Meanwhile, an end of the sliding portion 330 may come into contact with the end of the guide portion G so that the sliding portion 330 does not move in the inward direction (in the +x-axis direction in the figure) any more. In this case, the battery module may be more easily assembled by accurately guiding the position of the sensing block 300, and it is possible to prevent that the sensing block 300 moves toward the cell assembly 100 excessively to damage the electrode lead 111 and the like.

The stopper may be configured in various other shapes than those of FIGS. 17 and 18.

Figure 19:
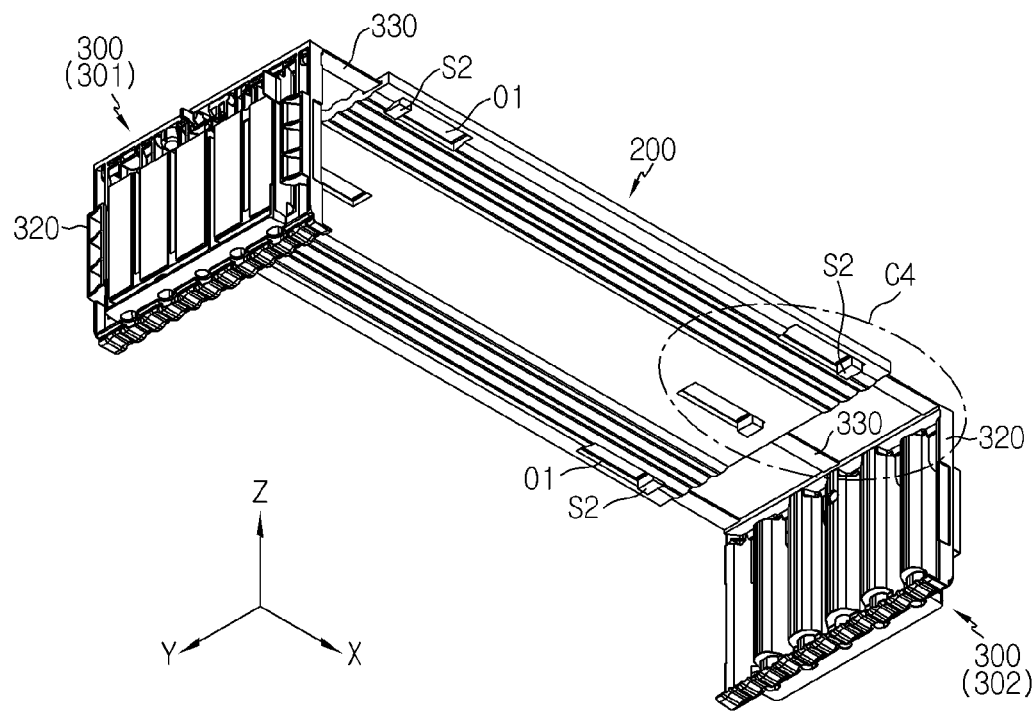
FIG. 19 is a perspective view showing that the sensing block having the stopper is coupled to the upper housing according to another embodiment of the present disclosure, observed from the below.

FIG. 19 is a perspective view showing that the sensing block 300 having the stopper is coupled to the upper housing 200 according to another embodiment of the present disclosure, observed from the below. Also FIG. 20 is an enlarged view showing a portion C4 of FIG. 19.

Figure 20:
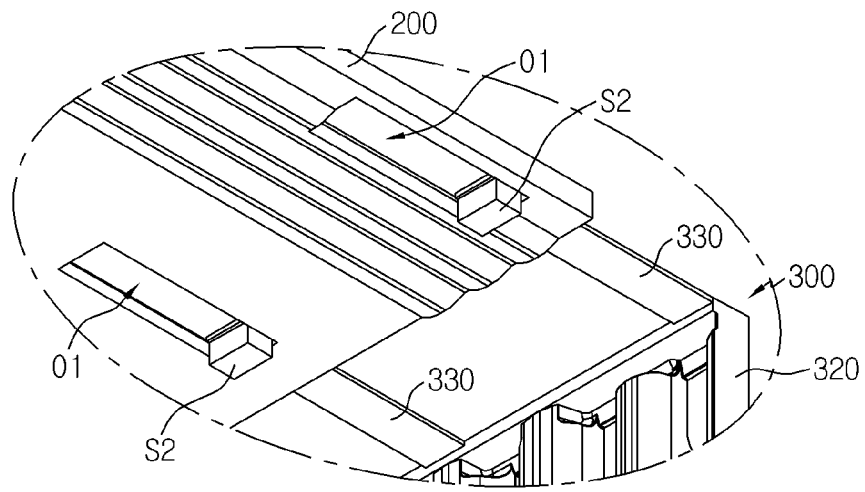
FIG. 20 is an enlarged view showing a portion C4 of FIG. 19.

Referring to FIGS. 19 and 20, a stopper S2 may be provided at a predetermined position of the sliding portion 330 of the sensing block 300, for example at an end of the sliding portion 330, in a downwardly convex shape. The stopper S2 may be integrally formed with the sliding portion 330 from the beginning or may be formed separately from the sliding portion 330 and then attached to the sliding portion 330. In addition, the upper housing 200 may have a first opening O1 that is opened downward at a region where the sliding portion 330 is inserted and moved. At this time, the first opening O1 may be formed to elongate along the sliding direction of the sliding portion 330, namely along the forward and rearward direction (along the x-axis direction in the figure).

In this case, the stopper S2 of the sensing block 300 may be exposed and protruded downward through the first opening O1 of the upper housing 200. In addition, if the sliding portion 330 moves in the forward and rearward direction inside the upper housing 200, the stopper S2 of the sensing block 300 may move along the longitudinal direction of the first opening O1 of the upper housing 200. At this time, if the stopper S2 of the sensing block 300 reaches the end of the first opening O1, the sensing block 300 is not able to slide any more. Thus, by using the stopper S2 and the first opening O1, it is possible to limit the outward movement or the inward movement of the sensing block 300.

Figure 21:
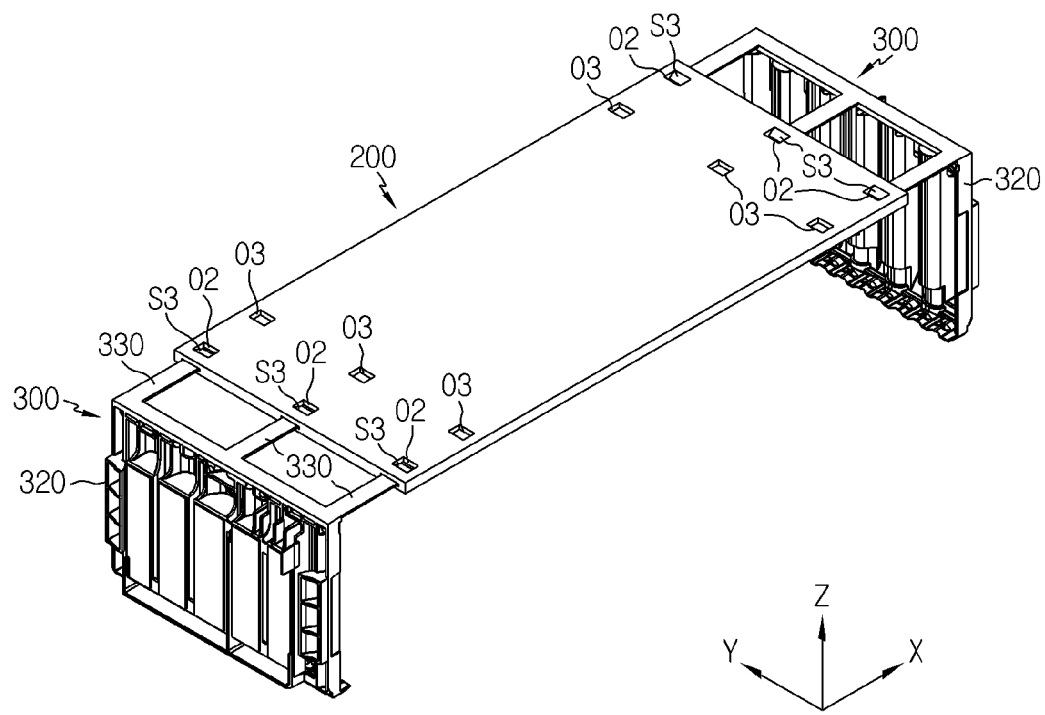
FIG. 21 is a perspective view showing a sensing block having a stopper according to still another embodiment of the present disclosure, observed from the above.
Figure 22:
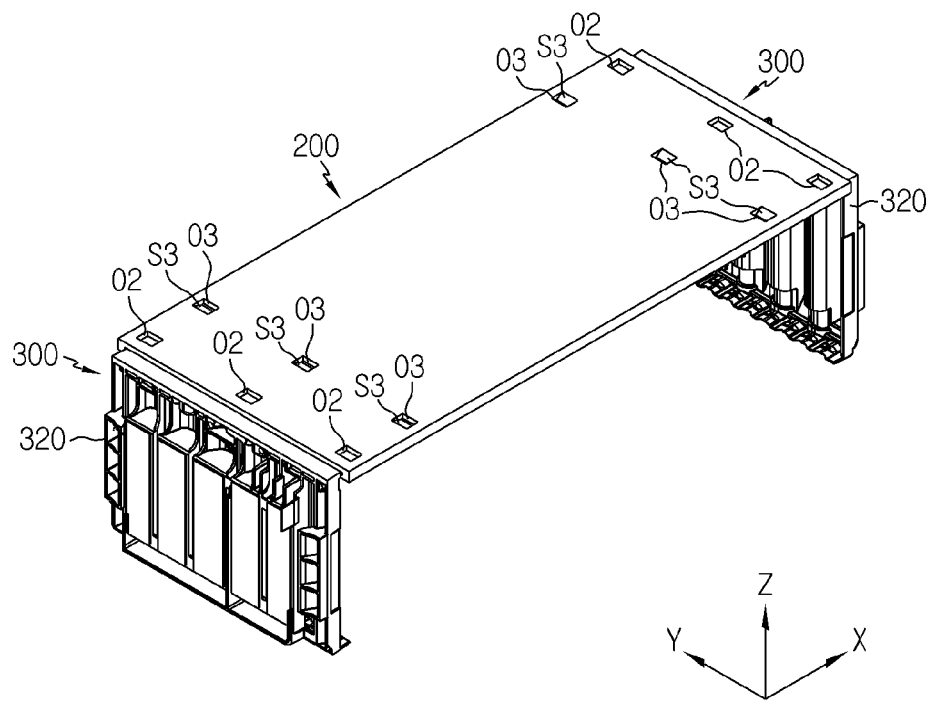
FIG. 22 is a perspective view schematically showing that the sensing block of FIG. 21 moves inwards by sliding.

FIG. 21 is a perspective view showing a sensing block 300 having a stopper according to still another embodiment of the present disclosure, observed from the above, and FIG. 22 is a perspective view schematically showing that the sensing block 300 of FIG. 21 moves inwards by sliding. Also FIG. 23 is an enlarged view showing a side section of a portion C5 of FIG. 22.

Figure 23:
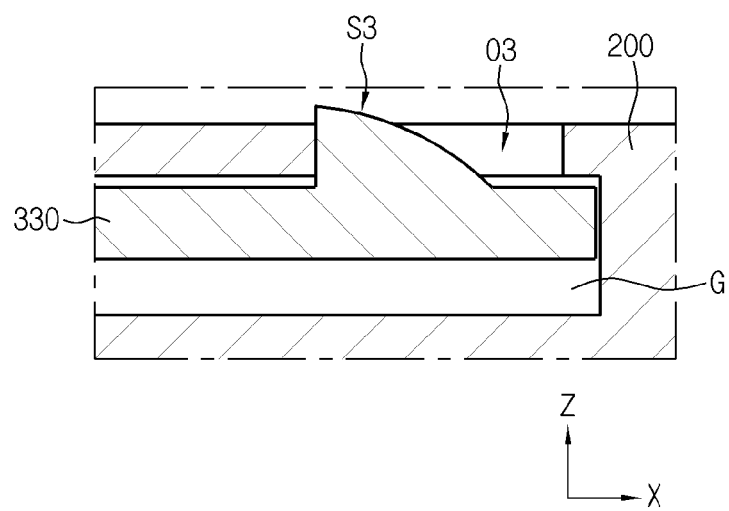
FIG. 23 is an enlarged view showing a side section of a portion C5 of FIG. 22.

Referring to FIGS. 21 to 23, the upper housing 200 may include at least one second openings O2 and/or at least one third opening O3, which are opened upward. Here, the second opening and the third opening may be spaced apart from each other by a predetermined distance in the forward and rearward direction (in the x-axis direction in the figure), namely in the sliding direction of the sliding portion 330. In addition, the second opening O2 and the third opening O3 may be formed in a moving path along which the sliding portion 330 moves in the upper housing 200, for example the hollow G of the upper housing 200. That is, the second opening O2 and the third opening O3 may be formed together on one sliding path where one sliding portion 330 moves.

In this configuration, the sensing block 300 may include a stopper S3 formed at a portion of the sliding portion 330, for example at an inner end of the sliding portion 330 as shown in FIG. 23, to protrude in the upward direction (in the +z-axis direction in the figure). In addition, the stopper S3 of the sliding portion 330 may be exposed and protruded outward through the second opening O2 and/or the third opening O3.

According to this configuration of the present disclosure, the stopper S3 of the sliding portion 330 may be inserted into the second opening O2 and/or the third opening O3 of the upper housing 200 to limit the movement of the sliding portion 330.

Here, along the sliding direction, the second opening O2 may be located relatively at an outer side, and the third opening O3 may be located relatively at an inner side. At this time, both the second opening and the third opening may prevent the sliding portion 330 from further moving in the outward direction. In this case, the second opening O2 may prevent the sensing block 300 from being separated from the upper housing 200.

In addition, the third opening O3 may stably maintain the assembled state of the sensing block 300 and the cell assembly 100 in a state where the sensing block 300 is in close contact with the upper housing 200 and assembled with the cell assembly 100. For example, while the battery module is being assembled, the sensing block 300 may move toward the cell assembly 100 side and be coupled by being perforated by the electrode lead 111. At this time, as shown in FIG. 23, as the stopper S3 is inserted into the third opening O3, the sensing block may be not moved in the outward direction any more. Thus, while the battery module is being assembled or used, the coupling state between the sensing block 300 and the electrode lead 111 may be stably maintained.

The stopper S3 may be configured to not move in the outward direction in a state of being inserted into the second opening O2 and/or the third opening O3. For example, as shown in FIG. 23, the stopper S3 may be configured such that its outer surface is flat in the upward and downward direction (in the z-axis direction in the figure), namely to stand perpendicular to the upper surface of the sliding portion 330. In addition, the stopper S3 may be configured such that its inner surface has a sloped shape at an acute angle with respect to the upper surface of the sliding portion 330, namely to have a height gradually lowering in the inward direction. According to this configuration of the present disclosure, in a state where the stopper S3 is inserted into the second opening O2 or the third opening O3, the outward movement of the sliding portion 330 may be limited by the outer surface. Meanwhile, since the inner surface of the stopper S3 is inclined, the stopper S3 may be moved in the inward direction even in a state of being inserted into the second opening O2 or the third opening O3. However, in this configuration, as shown in FIG. 23, the inward movement of the sliding portion 330 may be limited as the end thereof reaches the end of the hollow G.

Meanwhile, in this configuration, since the stopper S3 of the sensing block 300 is exposed to the outside of the upper housing 200, for example to the upper portion of the upper housing 200, through the second opening O2 or third opening O3, the sensing block 300 may be moved in the outward direction through the opening. For example, if it is intended to move the sensing block 300 in the outward direction in a state where the stopper S3 is inserted into the third opening O3, the user pushes the stopper S3 exposed through the third opening O3 in the downward direction so that the stopper S3 moves out of the third opening O3. Thus, even after the battery module is assembled, the sensing block 300 may be separated from the cell assembly 100 easily in order to replace or repair some parts.

In addition, when the sensing block 300 includes the auxiliary coupling portion 340 as shown in FIGS. 14 to 16, the stopper for limiting the sliding distance of the sensing block 300 may also be provided at the auxiliary coupling portion 340.

Figure 24:
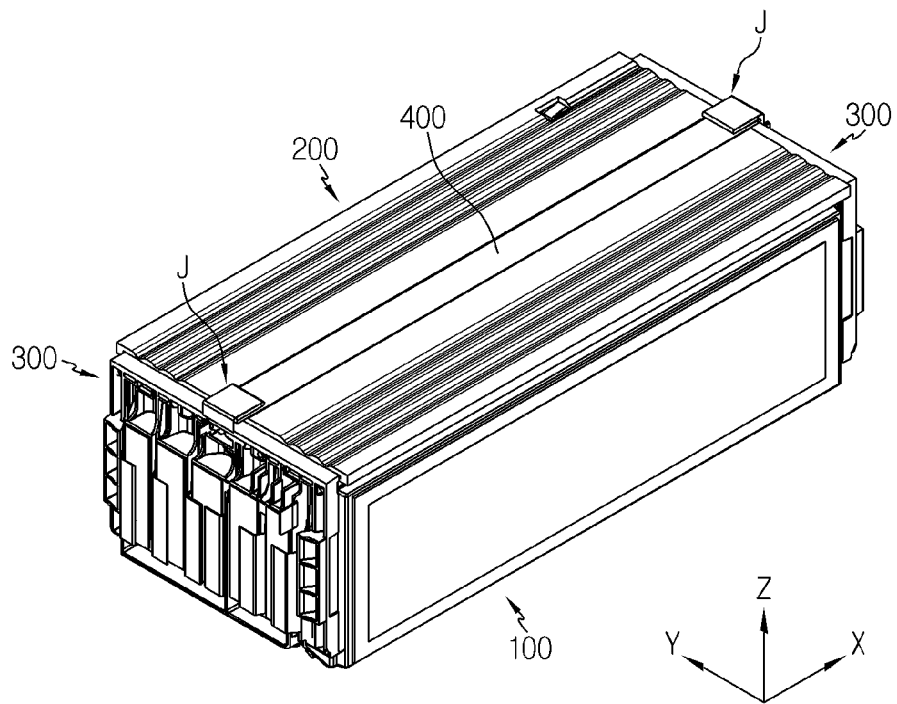
FIGS. 24 and 25 are perspective views schematically showing a battery module according to still another embodiment of the present disclosure.
Figure 25:
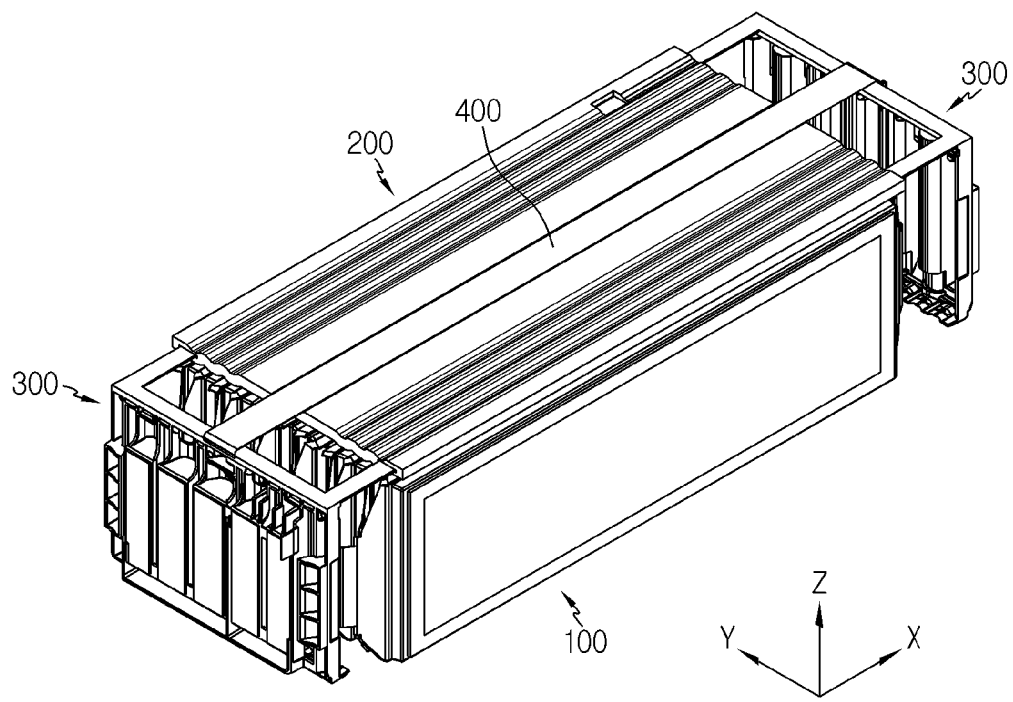

FIGS. 24 and 25 are perspective views schematically showing a battery module according to still another embodiment of the present disclosure. In particular, FIG. 25 may be regarded as a diagram where the sensing block is moved outwards in the battery module of FIG. 24.

As shown in FIGS. 24 and 25, the sensing cable 400 may be in the form of a flexible printed circuit board, instead of a wire.

In particular, the sensing cable 400 may include a folding portion that is folded in the longitudinal direction in at least a portion thereof, as indicated by J in FIG. 24. In addition, the folding portion J of the sensing cable may function as the variable portion that changes the length of the sensing cable 400 in the forward and rearward direction.

According to this configuration of the present disclosure, if the sensing block 300 moves in the direction away from the cell assembly 100, namely in the outward direction, as shown in FIG. 25, the folding portion of the sensing cable 400 is gradually expanded, and the length of the sensing cable 400 in the forward and rearward direction may be increased. In addition, if the sensing block 300 moves in the inward direction to be closer to the cell assembly 100, as shown in FIG. 24, the folding portion J of the sensing cable 400 is folded again, and the length of the sensing cable 400 in the forward and rearward direction may be decreased.

A battery pack according to the present disclosure may include at least one battery module of the present disclosure. In particular, the battery pack may further include electrical components such as a battery management system (BMS), a relay, a fuse and the like, in addition to the battery module. In addition, the battery pack may further include a pack case for accommodating the battery module and various electric parts in an inner space thereof.

The battery module according to the present disclosure may be applied to a vehicle. That is, the vehicle according to the present disclosure may include at least battery module of the present disclosure. In other words, the vehicle according to the present disclosure may include at least one battery pack of the present disclosure. In particular, the vehicle according to the present disclosure may be a vehicle that obtains a driving power from the battery module, for example an electric vehicle or a hybrid vehicle.

Also, the battery module according to the present disclosure may be applied to an electric power storage system (ESS). That is, the electric power storage system according to the present disclosure may include at least one battery module of the present disclosure.

Meanwhile, in the present specification, when terms indicating directions such as upward, downward, left, right, forward and rearward directions are used, these terms are just for convenience of explanation and can be varied depending on the position of an object to be observed or the position of an observer, as obvious to those skilled in the art. For example, if the battery module depicted in FIG. 1 is reversed vertically, the upper housing 200 is arranged at a lower portion of the cell assembly 100.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

100: cell assembly
110: secondary battery, 111: electrode lead
200: upper housing
300: sensing block
301: front block, 302: rear block
310: bus bar, 320: bus bar mounting portion, 330: sliding portion. 340: auxiliary coupling portion
400: sensing cable
500: cooling plate
510: auxiliary insert portion
S1, S2, S3: stopper

What is claimed is:
1. A battery module, comprising:
a cell assembly having a plurality of secondary batteries stacked in at least one direction, each secondary battery having a first electrode lead protruding in a forward direction thereof and a second electrode lead protruding in a rearward direction thereof to define a longitudinal axis;

an upper housing disposed at an upper portion of the cell assembly; and a sensing block, the sensing block including:

a first block located at a front side of the cell assembly at the first electrode leads and having a first bus bar made of an electrically conductive material and contacting adjacent first electrode leads of the secondary batteries at the corresponding front side of the cell assembly, the first block being slidably coupled to the upper housing; and a second block located at a rear side of the cell assembly at the second electrode leads and having a second bus bar made of an electrically conductive material and contacting adjacent second electrode leads of the secondary batteries at the corresponding rear side of the cell assembly, the second block being slidably coupled to the upper housing, wherein the first block and the second block extend beyond an outermost perimeter of the upper housing in the forward and rearward direction, and wherein the first and second blocks are configured to be slidable toward and away from each other along the longitudinal axis while being slidably coupled to the upper housing.

2. The battery module according to claim 1,
wherein the first block further includes a first bus bar mounting portion so that the first bus bar is mounted thereto, and at least one sliding portion located at an upper portion of the first bus bar mounting portion to protrude toward the upper housing, the sliding portion being slidably coupled to the upper housing.

3. The battery module according to claim 2,
wherein the upper housing has a guide portion into which the sliding portion is inserted so as to be movable along the forward direction and the rearward direction relative to the cell assembly.

4. The battery module according to claim 3,
wherein the guide portion has a hollow shape formed at the upper housing and extending along the forward direction and the rearward direction relative to the cell assembly.

5. The battery module according to claim 2, further comprising:

a sensing cable extending in the forward direction and the rearward direction relative to the cell assembly and electrically connected to the first bus bar to provide a path for transmitting sensed information from the first bus bar.

6. The battery module according to claim 5,
wherein the sensing cable has an adjustable length.

7. The battery module according to claim 2, wherein the sliding portion is cantilevered from the bus bar mounting portion.

8. The battery module according to claim 1,
wherein the first block has a hole through which one of the first electrode leads of the first electrode leads of the secondary batteries extends, the first bus bar being mounted to an outer side of the first block.

9. The battery module according to claim 1, further comprising:

a cooling plate made of a plate-shaped thermally conductive material and disposed at a lower portion of the cell assembly to absorb heat of the cell assembly, wherein the first block further includes an auxiliary coupling portion provided at a lower portion thereof to protrude toward the cooling plate, and wherein the cooling plate further includes an auxiliary insert portion so that the auxiliary coupling portion is inserted therein and movable in the forward direction and the rearward direction relative to the cell assembly.

10. The battery module according to claim 1,
wherein the first block further includes a stopper for limiting a sliding distance of the first block within a predetermined distance.

11. A battery pack, comprising a battery module defined in claim 1.

12. A vehicle, comprising a battery module defined in claim 1.

* * * * *